United States Patent
Kanzaki et al.

(10) Patent No.: US 7,326,893 B2
(45) Date of Patent: Feb. 5, 2008

(54) HIGH FREQUENCY HEATING APPARATUS HAVING STEAM GENERATING FUNCTION

(75) Inventors: Kouji Kanzaki, Yamatokoriyama (JP); Yasuhisa Mori, Kitakaturagi-gun (JP); Masato Matsuda, Shiki-gun (JP); Hiroshi Kawai, Kashihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 230 days.

(21) Appl. No.: 10/557,354

(22) PCT Filed: May 19, 2004

(86) PCT No.: PCT/JP2004/007111

§ 371 (c)(1),
(2), (4) Date: Nov. 17, 2005

(87) PCT Pub. No.: WO2004/104481

PCT Pub. Date: Dec. 2, 2004

(65) Prior Publication Data

US 2007/0029313 A1   Feb. 8, 2007

(30) Foreign Application Priority Data

| May 20, 2003 | (JP) | ............................. 2003-141723 |
| May 20, 2003 | (JP) | ............................. 2003-141724 |
| May 20, 2003 | (JP) | ............................. 2003-141725 |
| Jun. 27, 2003 | (JP) | ............................. 2003-184171 |
| Jul. 17, 2003 | (JP) | ............................. 2003-198313 |

(51) Int. Cl.
   *H05B 6/80* (2006.01)
   *F24C 7/02* (2006.01)

(52) U.S. Cl. ...................... 219/682; 219/756; 219/401; 99/451

(58) Field of Classification Search ........ 219/680–682, 219/756, 401; 99/451, 325, DIG. 14; 432/91
See application file for complete search history.

(56) References Cited

U.S. PATENT DOCUMENTS

| 6,040,564 | A | * | 3/2000 | Ueda et al. ................. 219/682 |
| 6,133,558 | A | * | 10/2000 | Ueda et al. ................. 219/682 |
| 6,232,587 | B1 | * | 5/2001 | Kurita et al. ................ 219/682 |

FOREIGN PATENT DOCUMENTS

JP     53-83137     7/1978

(Continued)

*Primary Examiner*—Philip H. Leung
(74) *Attorney, Agent, or Firm*—Pearne & Gordon LLP

(57) ABSTRACT

A high frequency heating apparatus having a steam generating function including a heater main body 111 embedded with heater 27, a transport tube heating portion 113 for boiling a liquid in a transport tube 112, and a heat conduction control portion 114 comprising a material having a heat conductivity smaller than a heat conductivity of a material forming an evaporating portion 25 and capable of restraining adherence of scale in accordance with local boiling in the transport tube by reducing an amount of heat conducted to the transport tube 112 while ensuring heat energy supplied to an evaporating side by setting heater to a high temperature. Further, a steam supply mechanism for excellently maintaining a balance of supply of the heat energy to a side of a transport portion and a side of an evaporating portion and continuously generating steam at a high temperature near to 100° C. can be provided.

38 Claims, 26 Drawing Sheets

FOREIGN PATENT DOCUMENTS

| | | |
|---|---|---|
| JP | 54-10460 | 1/1979 |
| JP | 54-115448 | 9/1979 |
| JP | 56-78901 | 6/1981 |
| JP | 61-141336 | 6/1986 |
| JP | 63-176901 | 7/1988 |
| JP | 8-178298 | 7/1996 |
| JP | 2000-232943 | 8/2000 |
| JP | 2003-038354 | 2/2003 |
| JP | 2004-061001 | 2/2004 |
| JP | 3714339 | 9/2005 |
| WO | 03-077604 | 9/2003 |
| WO | 03-077605 | 9/2003 |

* cited by examiner

133: THERMISTOR

WHEN A < X

WHEN A > X

A > X, B < X/2
BEFORE FASTENING SCREW

A > X, B < X/2
AFTER FASTENING SCREW

HIGH FREQUENCY HEATING APPARATUS HAVING STEAM GENERATING FUNCTION

TECHNICAL FIELD

The present invention relates to a high frequency heating apparatus having a steam generating function including high frequency wave generating means for outputting a high frequency wave into a heating chamber containing a heated object, and a steam supply mechanism for supplying steam into the heating chamber for heating to process the heated object by supplying at least either one of a high frequency wave and steam to the heating chamber.

BACKGROUND ART

A high frequency heating apparatus having high frequency wave generating means for outputting a high frequency wave into a heating chamber containing a heated object has rapidly been spread as an electronic range which is a heating cooking apparatus of a food material or the like since the heated object in the heating chamber can be heated in a short period of time and efficiently.

However, there is an inconvenience that heating is limited only to heating by high frequency heating and the apparatus cannot deal with various ways of cooking.

Hence, there is proposed a high frequency heating apparatus capable of executing oven heating by adding an electric heater for generating heat in a heating chamber and in recent years, there is proposed a high frequency heating apparatus having a steam generating function capable of executing also heating cooking by high temperature steam by adding a steam supply mechanism for supplying heating steam into a heating chamber (for example, JP-A-54-115448).

The steam supply mechanism in the high frequency heating apparatus of the background art is constructed by a constitution of including a water storing tank detachably mounted to an apparatus main body, a fed water receiving bowl (evaporating portion) mounted into the heating chamber, heating means for evaporating water on the fed water receiving bowl (evaporating portion) by heating the fed water receiving bowl (evaporating portion) and exclusive pump means for supplying water in the water storing tank to the fed water receiving bowl (evaporating portion) and by mounting the pump means, there poses a problem that the constitution is complicated and large-sized.

Further, according to the steam supply mechanism of the background art using the exclusive pump means, in order to control an amount of supplying steam into the heating chamber, simultaneously with a temperature control of the heating means, also a control of a supply amount by the pump means is needed and there also poses a problem that a control processing necessary for controlling the supply amount of steam is complicated.

Further, water stored in the water storing tank is delivered to the fed water receiving bowl (evaporating portion) by the exclusive pump means, during the time period, water is delivered without being subjected to preparatory heating or the like (also for avoiding a trouble of the pump from being brought about by hot water) and therefore, a temperature of water supplied to the fed water receiving bowl (evaporating portion) is low, and there also poses a problem that a long period of time is taken during a time period until generating steam by heating the fed water receiving bowl (evaporating portion) by the heating means.

On the other hand, it is also possible to supply water to the fed water receiving bowl by heating a transport tube for supplying water from the water storing tank to the fed water receiving bowl (evaporating portion) and boiling water at inside thereof In this case, it is necessary to control an amount of heating the transport tube.

That is, when supply of heat to the transport tube is large, supply of heat to the evaporating portion becomes deficient and water is stored at the evaporating portion. Further, steam having a low temperature is generated, or an amount of steaming becomes insufficient. Further, although in order to evaporate water without leaving a water component in the evaporating portion, it is necessary to increase a heat capacity provided to the evaporating portion or operate heating means after stopping to supply water, when the heat capacity of the evaporating portion is increased, a rise time period until generating steam is prolonged and in the latter case, a method of detecting a temperature is needed.

On the other hand, when an amount of heat supplied to the transport tube is small, a failure in transportation is brought about. Further, when the failure in transportation is brought about, there is not a load of consuming the amount of heat generated by the heating means and therefore, the temperature of the heating means per se is elevated by self heat generation. In accordance with elevation of the temperature, the amount of heat supplied to a side of the transport tube is increased, and when the amount exceeds a threshold, water is transported while producing local boiling. As a result, the heating means returns to a predetermined temperature by supplying a load of consuming the heat amount to the evaporating portion. When the temperature is lowered to the predetermined temperature, the failure in transportation is brought about again. By repeating the phenomena, there also poses a problem of promoting adherence of scale in accordance with rapid local boiling in the transport tube to bring about clogging of the transport tube.

DISCLOSURE OF THE INVENTION

The invention has been carried out in view of the above-described problem and it is an object thereof to provide a high frequency heating apparatus having a steam generating function dispensing with exclusive pump means for supplying water in a water storing tank to a fed water receiving bowl (evaporating portion), capable of realizing to simplify and downsize a constitution of a steam supply mechanism by omitting the pump means, further, capable of simplifying a control processing necessary for controlling an amount of supply of steam, further, capable of heating steam swiftly by shortening a time period required for generating steam, further, capable of generating steam continuously by excellently maintaining a balance of supply of heat energy to a side of a transport portion and to a side of the evaporating portion.

In order to resolve the problem of the background art, a high frequency heating apparatus having a steam generating function of the invention is constituted by a high frequency heating apparatus having a steam generating function which is a high frequency heating apparatus having a steam generating function including high frequency wave generating means for outputting a high frequency wave into a heating chamber containing a heated object, and a steam supply mechanism for supplying heated steam into the heating chamber, wherein the heated object is heated to process by supplying at least either of the high frequency wave and the heated steam to the heating chamber, wherein the steam supply mechanism comprises a water storing tank mounted attachably and detachably to and from an apparatus main body, an evaporating portion mounted to inside of the heating chamber, heating means for evaporating water by heating the evaporating portion, a transport tube for transporting water to the evaporating portion by making water in the water storing tank boil locally by an energy generated by the heating means, and a heat conduction control portion comprising a material having a heat conductivity smaller than a heat conductivity of a material forming the evaporating portion and interposed between the transport tube and the heating means, and wherein an amount of a heat energy conducted from the heating means to the heat transport portion is controlled.

Further, it is preferable to provide a check valve on an upstream side of the heating portion in a liquid transport direction.

Further, there is constructed a constitution in which bubbles generated by boiling water in the transport tube by utilizing the heat energy of the heating means are prevented from moving to a side of the check valve.

Further, it is preferable to control a temperature of the transport tube to be equal to or lower than 120° C. when local boiling is produced by the heat energy conducted from the heat conduction control portion and water is transported to the evaporating portion.

Further, there is constructed a constitution in which bubbles generated by boiling water in the transport tube by utilizing the heat energy of the heating means are exhausted from an air exhaust portion provided at the transport tube.

According to the high frequency heating apparatus having the steam generating function constituted in this way, a water feeding path (transport tube) is arranged by way of a heating region by the heating means, the pump function is achieved by locally boiling water in the water feeding path by heat generated by the heating means and the exclusive pump means for supplying water in the water storing tank to the evaporating portion is not needed.

Therefore, simplification and small-sized formation of the constitution of the steam supply mechanism can be realized by omitting exclusive pump means.

Further, water is supplied to the evaporating portion by heat generated by the heating means and therefore, the supply amount control of the steam can be realized only by controlling heat generating operation of the heating means, and in comparison with a constitution of the background art in which the exclusive pump means needs to control, the control processing necessary for the supply amount control of steam can be simplified.

Further, water supplied to the evaporating portion is brought into a state of elevating a temperature thereof by heat generated by the heating means and therefore, a time period required for generating steam from when supplied to the evaporating portion can be shortened and steam can be heated swiftly.

Further, the evaporating portion can be set to a high temperature and a temperature of the heat transport portion can be set to a temperature range of 100 through 120° C. enabling to boil water and therefore, transported water can firmly and swiftly be evaporated while maintaining the liquid transport function, adherence of scale in the transport tube constituting the heat transport portion can be restrained and steam at high temperature can continuously be generated.

Further, even when bubbles in accordance with local boiling in the transport tube are generated, by escaping bubbles to an upper side of the transport tube, a stable liquid transport function is ensured and adherence of scale can be restrained and steam at a high temperature can continuously be generated.

BRIEF DESCRIPTION OF THE DRAWINGS

FIG. 29(a) is a view showing a state in which a width dimension A of a groove portion in a semicircular shape is smaller than an outer shape dimension X of a transport tube, FIG. 29(b) is a view showing a state in which the width dimension A of the groove portion in the semicircular shape is larger than the outer shape dimension X of the transport tube, FIG. 29(c) is a view showing a state in which the width dimension A of the groove portion in the semicircular shape is larger than the outer shape dimension X of a transport tube 112, and a depth dimension B of the groove portion in the semicircular shape is larger than an outer shape radius dimension X/2 of the transport tube, FIG. 29(d) is a view showing a state after fastening a screw from the state of FIG. 29(c);

BEST MODE FOR CARRYING OUT THE INVENTION

A detailed explanation will be given of a high frequency heating apparatus having a steam generating function according to an embodiment of the invention in reference to the attached drawings as follows.

Embodiment 1

Figure 1:
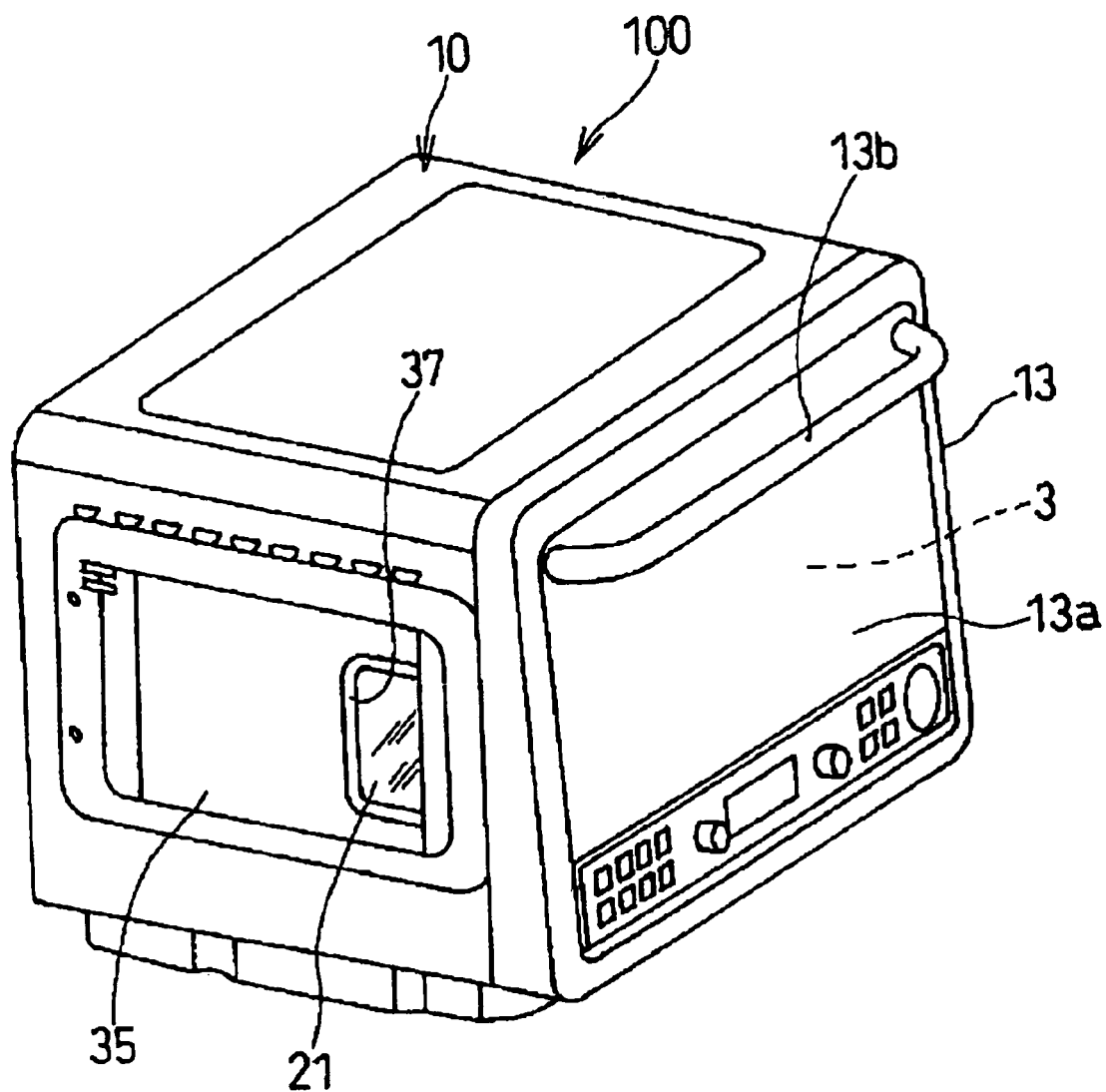
FIG. 1 is a perspective of an outlook of an embodiment of a high frequency heating apparatus having a steam generating function according to the invention.
Figure 2:
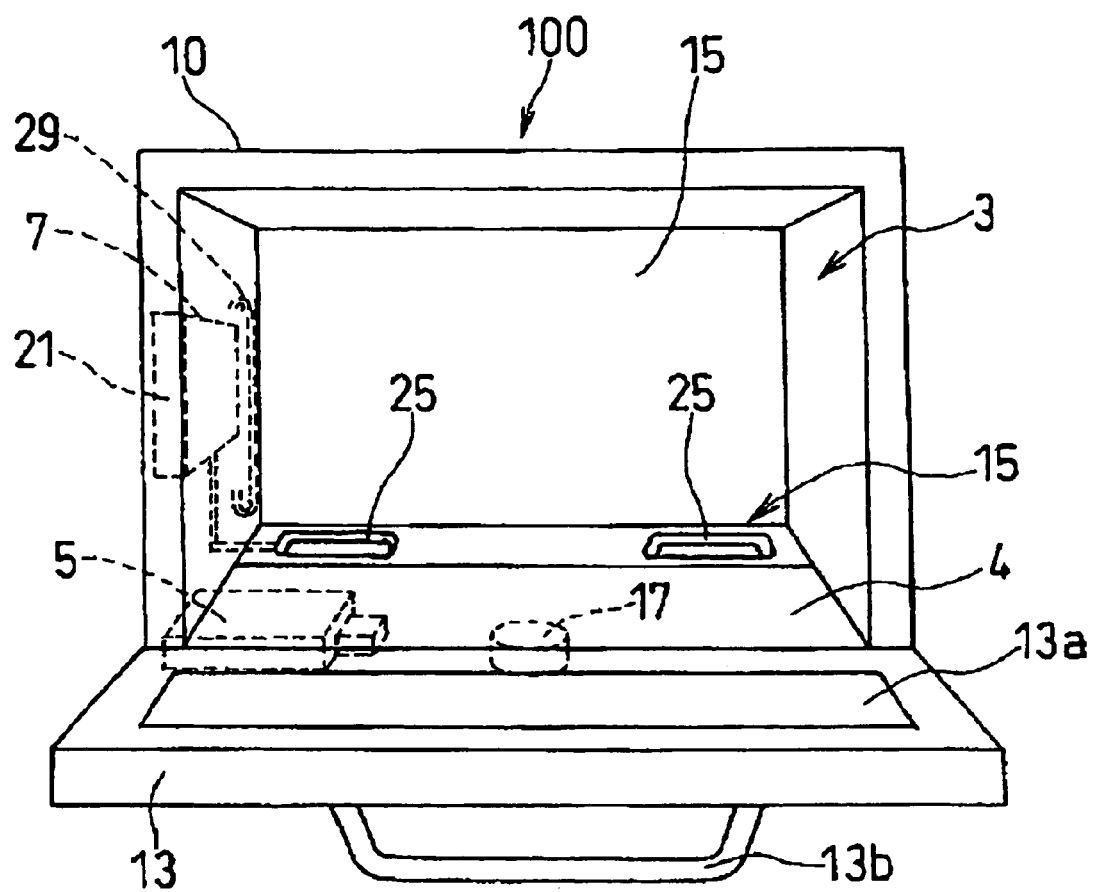
FIG. 2 is an outline constitution view when inside of a heating chamber is viewed from a front side in a state of opening an opening/closing door of the heating chamber of the high frequency heating apparatus having the steam generating function shown in FIG. 1.

FIG. 1 and FIG. 2 are outlook views of a high frequency heating apparatus having a steam generating function according to the invention.

The high frequency heating apparatus 100 having a steam generating function is used as an electronic range capable of heating to cook a food material by a high frequency wave and heated steam and includes high frequency wave generating means (magnetron) 5 for outputting a high frequency wave to inside of a heating chamber 3 containing a heated object of a food material or the like and a steam supply mechanism 7 for supplying heated steam into the heating chamber 3 for heating to process the heated object at inside of the heating chamber 3 by supplying at least either one of a high frequency wave and heated steam to the heating chamber 3.

The heating chamber 3 is formed at inside of a main body case 10 and a front face of the main body case 10 is provided with an opening/closing door 13 having a light transmitting window 13a for opening/closing a heated object take out port of the heating chamber 3. The opening/closing door 13 is made to be able to be opened and closed in an up and down direction by coupling a lower end thereof to a lower edge of the main body case 10 by a hinge and by grabbing a handle 13b mounted to an upper portion thereof to pull to a front side, an opened state shown in FIG. 2 can be constituted.

A predetermined insulating space is provided between wall faces of the heating chamber 3 and the main body case 10 and the space is charged with an insulating member as necessary.

Particularly, a space rearward from the heating chamber 3 is constituted by a circulating fan chamber containing a circulating fan for stirring an atmosphere at inside of the heating chamber 3 and a drive motor thereof (not illustrated) and a wall at a rear face of the heating chamber 3 constitutes a partition wall for partitioning the heating chamber 3 and the circulating fun chamber.

Although not illustrated, a partition wall 15 constituting a rear face wall of the heating chamber 3 is provided with a sucking vent hole for sucking air from a side of the heating chamber 3 to a side of the circulating fan chamber, and a wind blowing vent port for blowing wind from the side of the circulating fan chamber to the side of the heating chamber 3 by dividing forming areas thereof. The respective vent holes are formed as a number of punched holes.

In the case of the embodiment, as shown by FIG. 2, the high frequency generating means (magnetron) 5 is arranged at a space on a lower side of the heating chamber 3 and a stirrer blade 17 is provided at a position of receiving a high frequency wave generated from the high frequency heating apparatus 5. Further, by irradiating the high frequency wave from the high frequency wave generating means 5 to the rotating stirrer blade 17, the high frequency wave is supplied to inside of the heating chamber 3 while being stirred by the stirrer blade 17. Further, the high frequency generating means 5 and the stirrer blade 17 are not limited to be provided to a bottom portion of the heating chamber 3 but can also be provided at an upper face or a side of the heating chamber 3.

Figure 3:
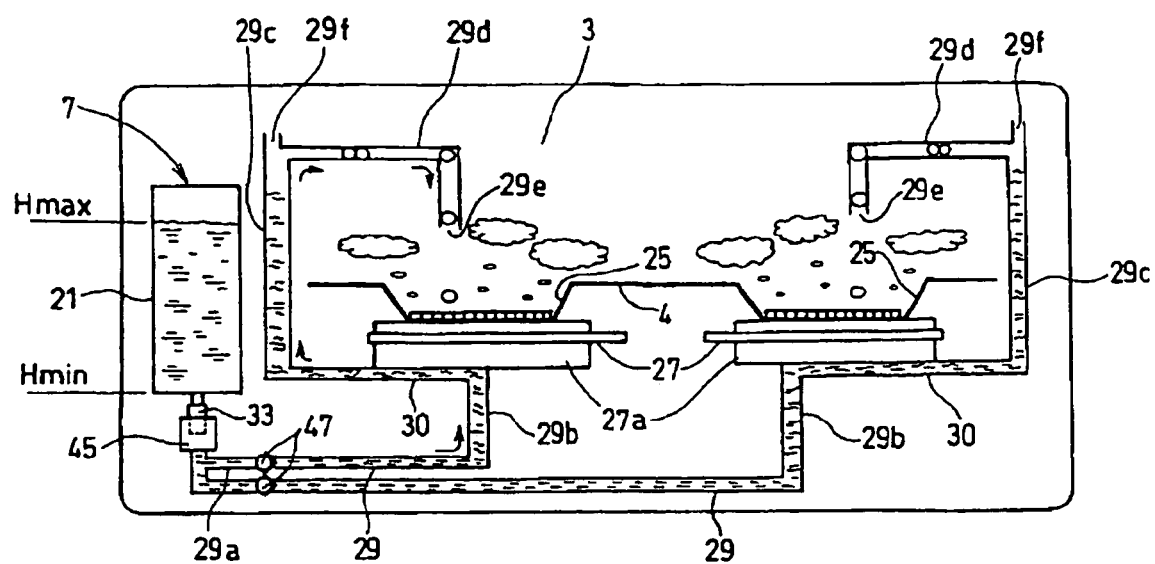
FIG. 3 is an outline constitution view of a steam supply mechanism in the high frequency heating apparatus having the steam generating function shown in FIG. 1.

As shown by FIG. 3, a vapor supply mechanism 7 is constituted by including one piece of a water storing tank 21 mounted attachably and detachably to and from an apparatus main body, two fed water receiving bowls (evaporating portions) 25 mounted in the heating chamber 3, heating means 27 for evaporating water on the fed water receiving bowls (evaporating portions) 25 by heating the fed water receiving bowls (evaporating portions), two routes of water feeding paths 29 for guiding water in the water storing tank 21 to the fed water receiving bowls (evaporating portions) by way of heating regions by the heating means 27, a cut-off valve 33 on a side of the tank and a cut-off valve 45 on a side of the water feeding paths mounted to portions connecting the water storing tank 21 and respective water feeding paths 29 for preventing water in the water storing tank and the water feeding paths from leaking out when the water storing tank 21 is removed, and check valves 47 arranged downstream from the cut-off valve 45 on the side of the water feeding paths for preventing water from flowing back from the water feeding paths 29 to the water storing tank 21.

According to the water feeding paths 29 comprising the two routes, although a detailed description will be given thereof later, distances from the heating regions by the respective heating means 27 to water blow out ports 29e at front ends of the water feeding paths are set to be an equal distance.

Figure 4:
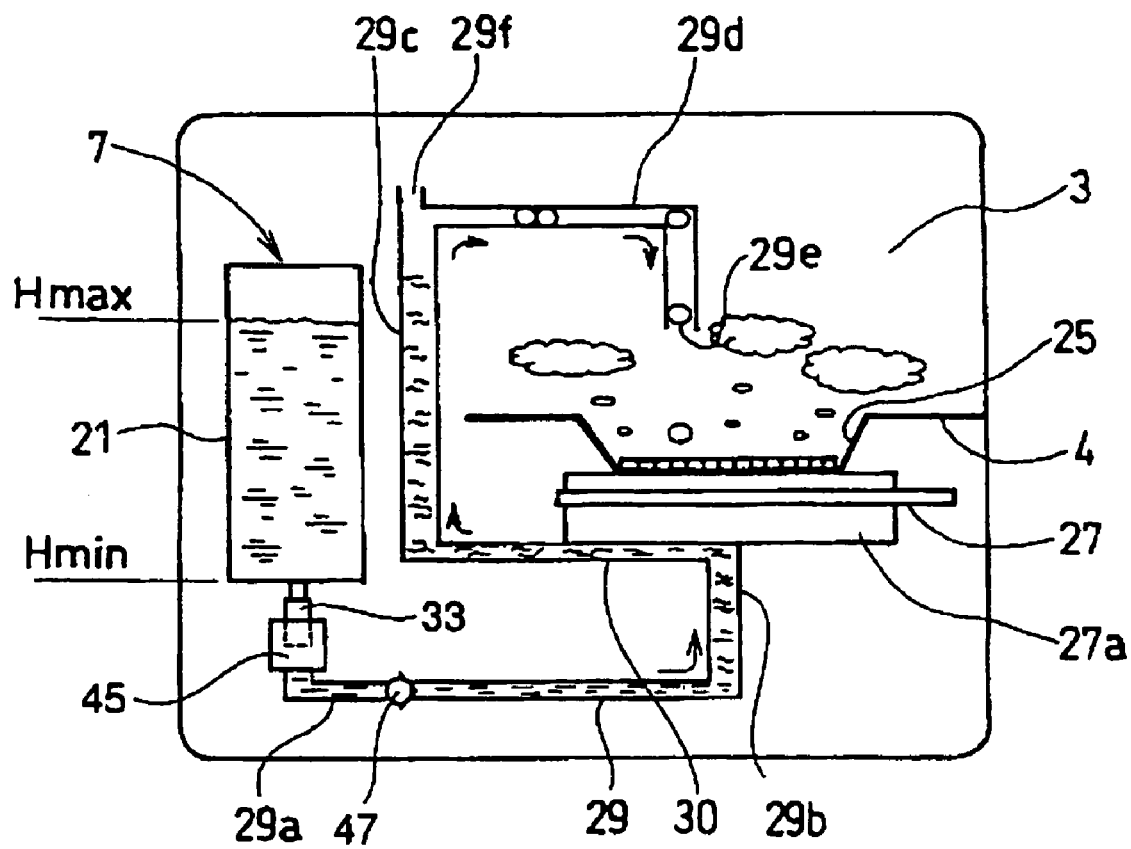
FIG. 4 is an outline constitution view of a steam supply mechanism when a single fed water receiving bowl is provided.

Further, as shown by FIG. 4, the vapor supply mechanism 7 can also be constructed by a constitution of generating steam by supplying water from one route of the water feeding path 29 to one fed water receiving bowl (evaporating portion) 25.

In the embodiment, the water storing tank 21 is of a cartridge type in a shape of a flat parallelepiped excellent in handling performance and is inserted to mount to a tank containing portion 35 integrated to the side face of the main body case 10 and also as shown in FIG. 1 such that the water storing tank 21 can easily be attached and detached to and from the apparatus main body (main body case 10) and the water storing tank 21 is difficult to be thermally damaged by heating inside of the heating chamber 3.

Figure 5:
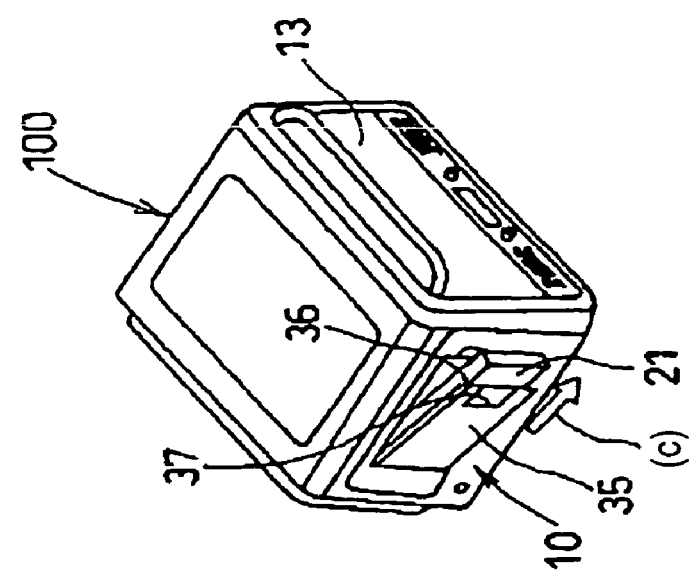
FIG. 5 illustrates explanatory views of operation of attaching and detaching a water storing tank in the high frequency heating apparatus having the steam generating function, FIG. 5(*a*) is an explanatory view of a state of mounting the water storing tank, FIG. 5(*b*) is an explanatory view of a state of exposing a tank inserting port, FIG. 5(*c*) is an explanatory view of a state of drawing out the water storing tank.
Figure 5:
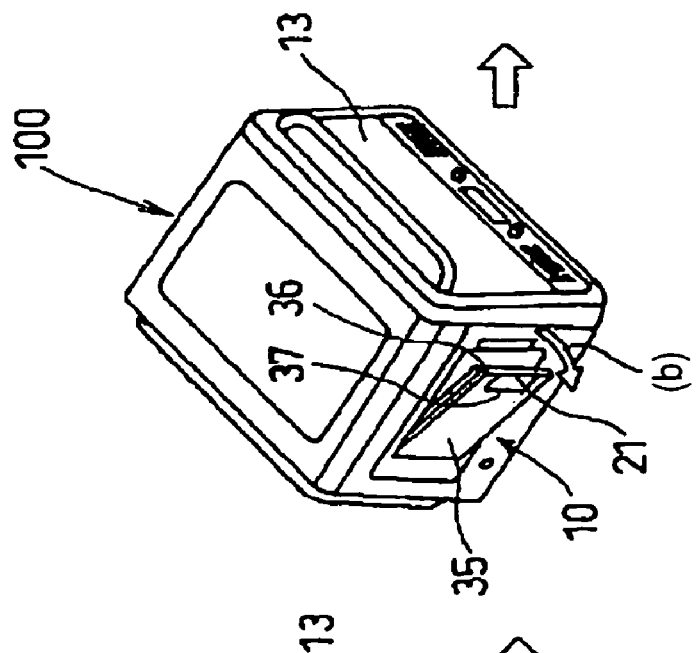
Figure 5:
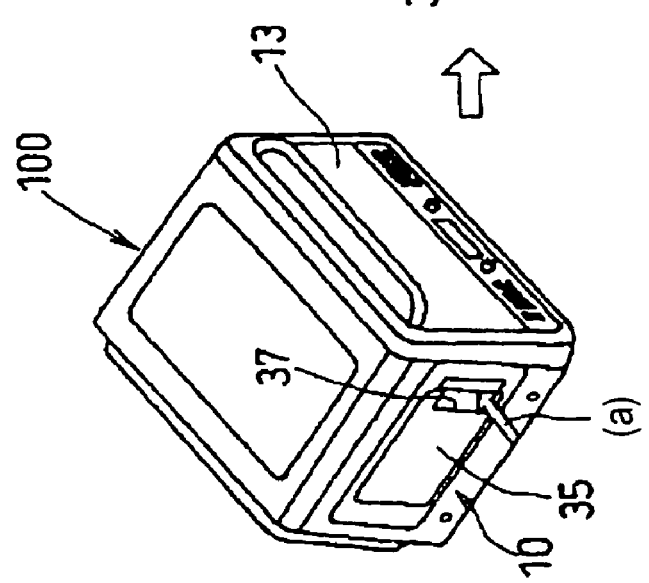

As shown by FIG. 5, a rear end side of the tank containing portion 35 is coupled to the main body case 10 by a hinge and when engagement of a front end portion thereof is disengaged as shown by an arrow mark (a) in FIG. 5(a), as shown by an arrow mark (b) in FIG. 5(b), a front end side is pivoted to an outer side and a tank inserting port 36 at the front end is exposed.

In a state of exposing the tank inserting port 36, the water storing tank 21 can be drawn out in a direction indicated by an arrow mark (c) in FIG. 5(c).

The water storing tank 21 is finished to be mounted by inserting the water storing tank 21 into the tank inserting port 36 in a direction reverse to a direction of drawing out the water storing tank 21.

Figure 6:
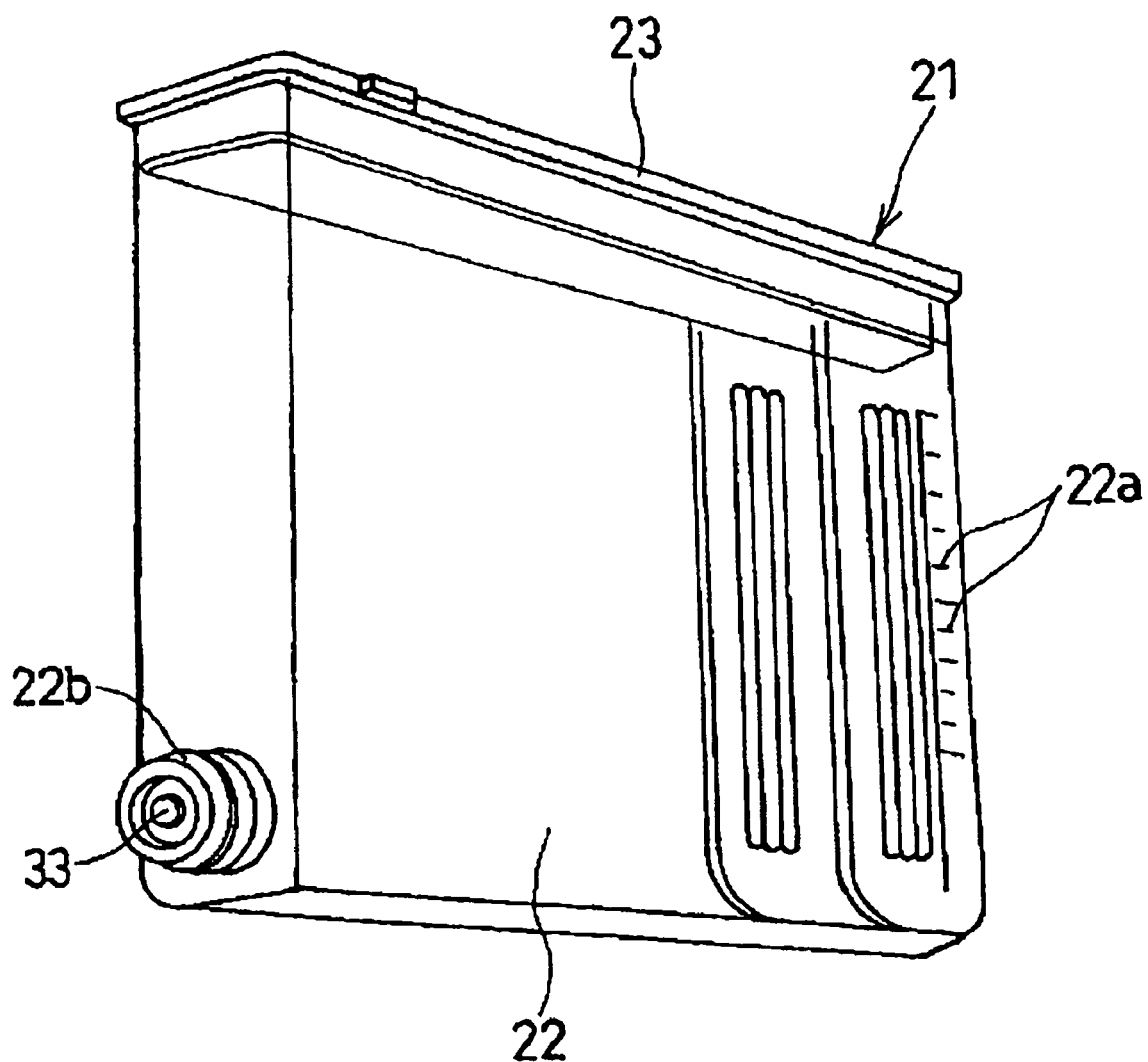
FIG. 6 is a perspective view enlarging the water storing tank used in the steam supply mechanism shown in FIG. 4.

As shown by FIG. 6, the water storing tank 21 is constituted by a vessel main body 22 in a shape of a flat parallelepiped an upper side of which is opened and an opening/closing lid 23 covering an upper opening portion of the vessel main body 22. The vessel main body 22 and the opening/closing lid 23 are formed by resin.

Figure 7:
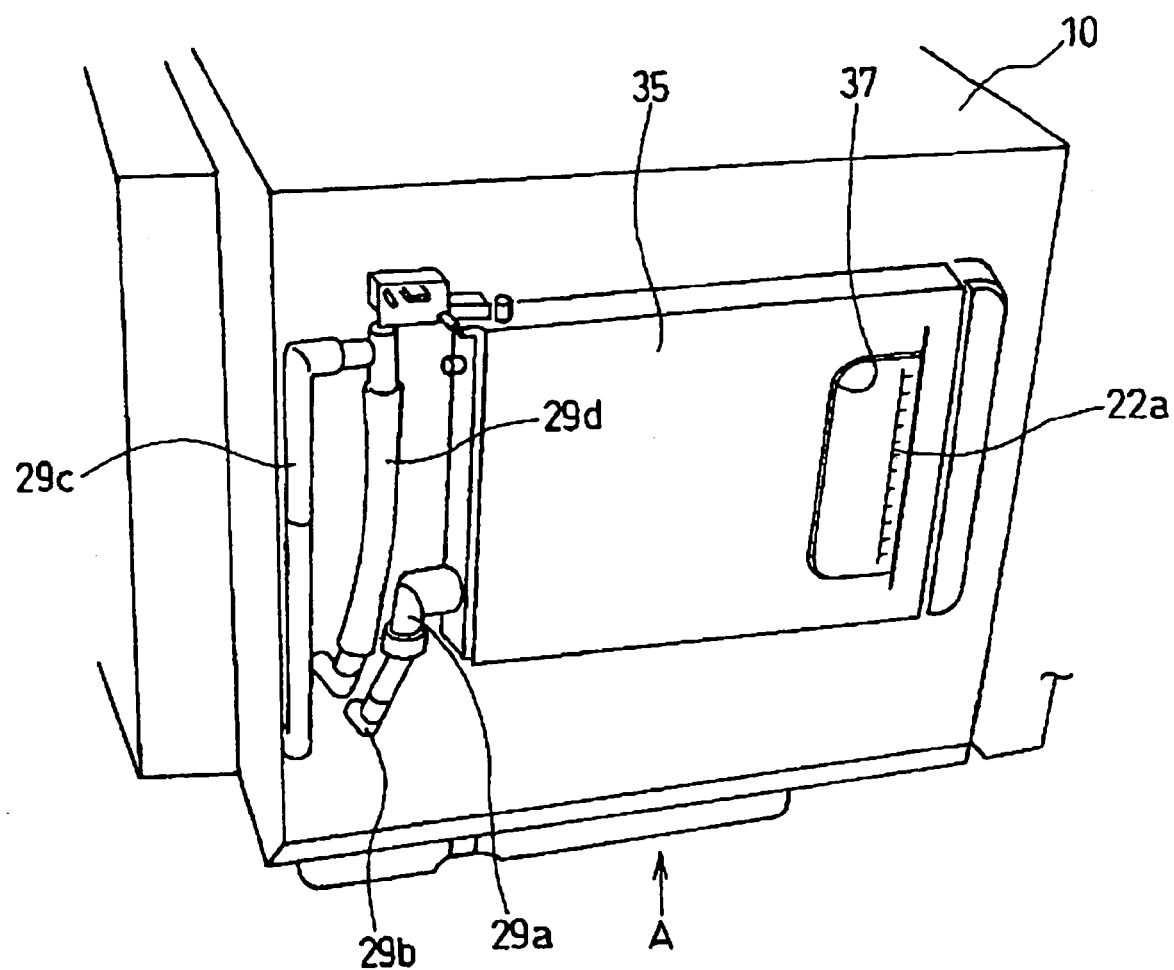
FIG. 7 is an explanatory view of an attaching structure at a side face of the apparatus of the steam supply mechanism shown in FIG. 4.

The vessel main body 22 is formed by transparent resin such that a remaining amount of water at inside thereof can optically be recognized and two side faces of the vessel main body 22 are mounted with graduations 22a indicating a remaining water level. Also as shown by FIG. 5 and FIG. 7, a portion thereof mounted with the graduation 22a is exposed to outside from a notched window 37 formed at a front end edge of the tank containing portion 35 and the remaining amount of water at inside of the water storing tank 21 is made to be recognized optically from outside.

Figure 8:
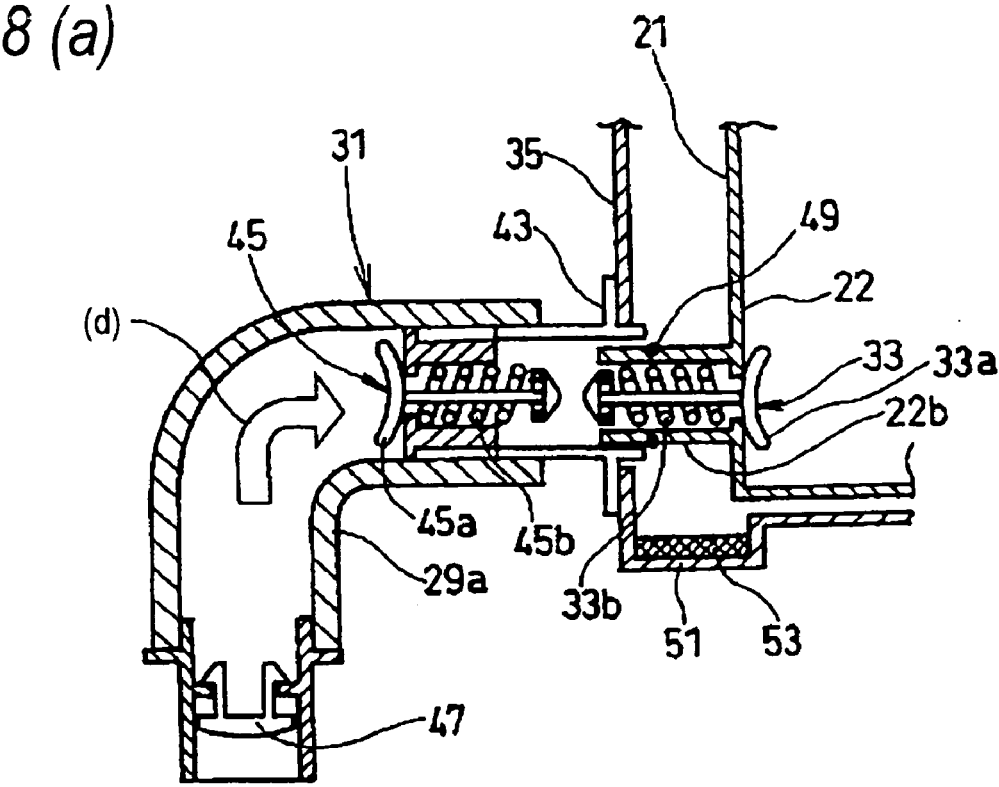
FIG. 8 illustrates explanatory views of a flow back preventing structure at a portion of connecting the water storing tank shown in FIG. 6 and a base end portion of a water feeding path, FIG. 8(*a*) is a view showing a state in which a connection port of a vessel main body is not fitted to a base end circular tube portion, FIG. 8(*b*) is a view showing a state in which the connection port of the vessel main body is properly fitted to the base end circular tube portion.
Figure 8:
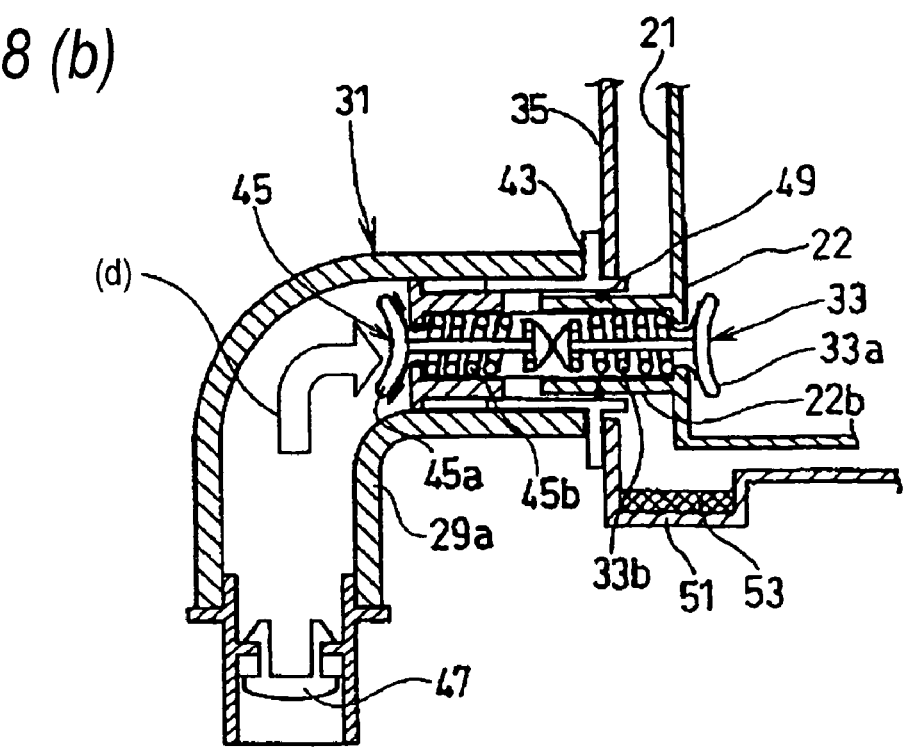

As shown by FIG. 6, a connection port 22b in a cylindrical shape connected to fit to the water feeding path 29 is projected at a position proximate to a lower portion of a rear face of the vessel main body 22. As shown by FIG. 8(a), the connection port 22b is provided with the cut-off valve 33 on the side of the tank for preventing stored water from flowing out by closing the connection port 22b in a state of taking out the water storing tank 21 from the apparatus main body.

The fed water receiving bowl (evaporating portion) 25 of the embodiment is constituted by forming a recess for receiving fed water at a portion of a bottom plate 4 of the heating chamber 3 and is integral with the bottom plate 4.

As described above, according to the embodiment, the fed water receiving bowls (evaporating 5 portion) 25 are respectively mounted to left and right sides of a rear portion of the bottom plate 4.

Figure 9:
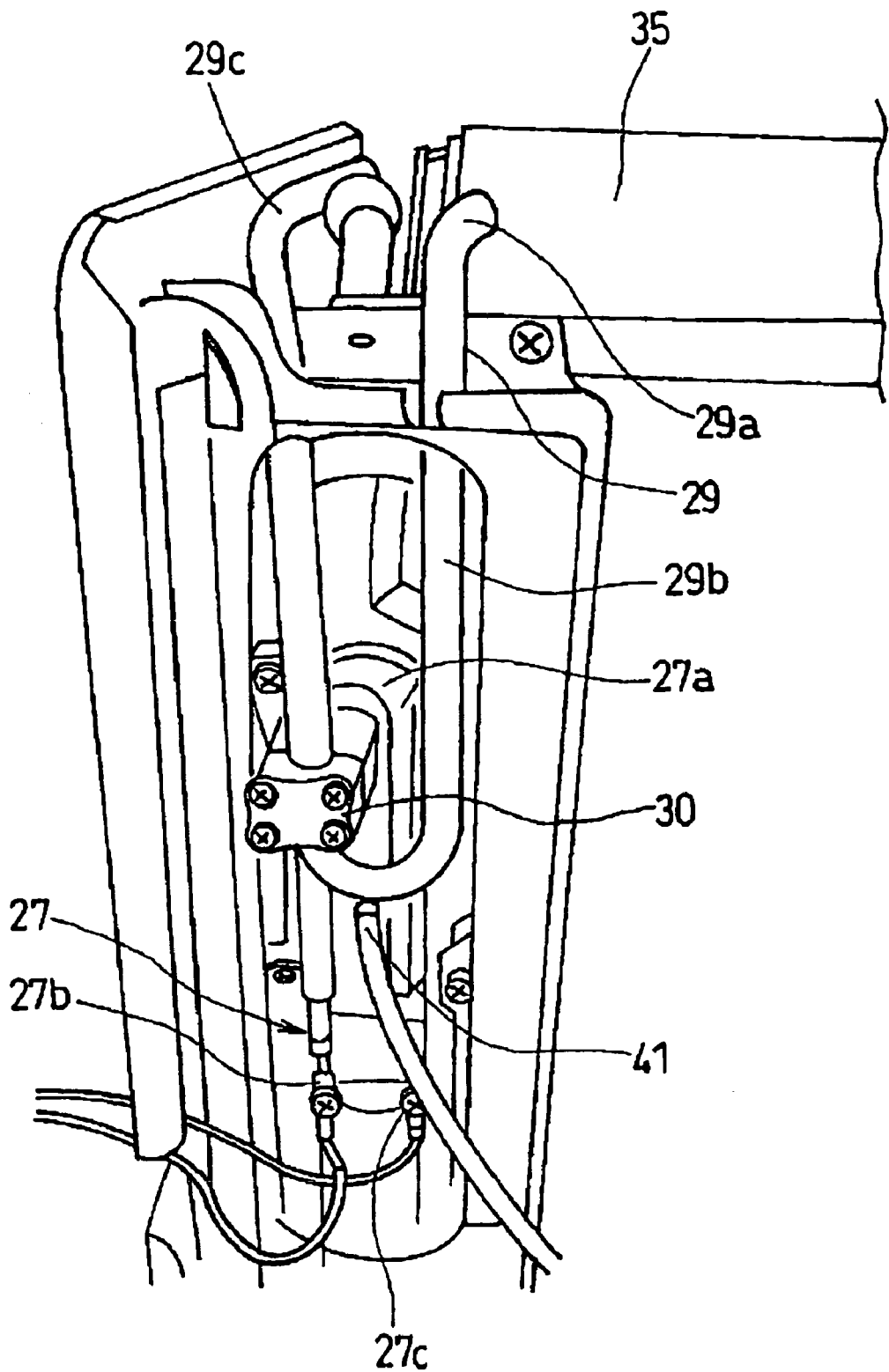
FIG. 9 is a view viewed in an arrow mark A direction of FIG. 6 and is an explanatory view of a constitution in which the water feeding path is heated by heating means arranged at a bottom portion of the apparatus.

The heating means 27 is a sheathed heater arranged to be brought into contact with a lower face of each fed water receiving bowl (evaporating portion) 25 and is constituted by a structure in which a heater main body is integrated to an integrating block 27a made by diecasting aluminum attached to a rear face of the fed water receiving bowl (evaporating portion) 25 in a state of being brought into close contact therewith as shown by FIG. 9. In the case of the embodiment, a thermistor 41 of as a temperature detecting sensor for detecting temperature of the heating means 27 is connected between a pair of electrodes 27b, 27c at both ends of the heater extended from the integrating block 27a.

The thermistor 41 is mounted between the pair of electrodes 27b, 27c in a state of being embedded to the integrating block 27a. A detecting signal of the thermistor 41 is monitored by a control circuit, not illustrated, and is utilized for detecting null of the remaining amount of the water storing tank 21 and controlling operation (controlling a heat generating amount) of the heating means 27.

Figure 10:
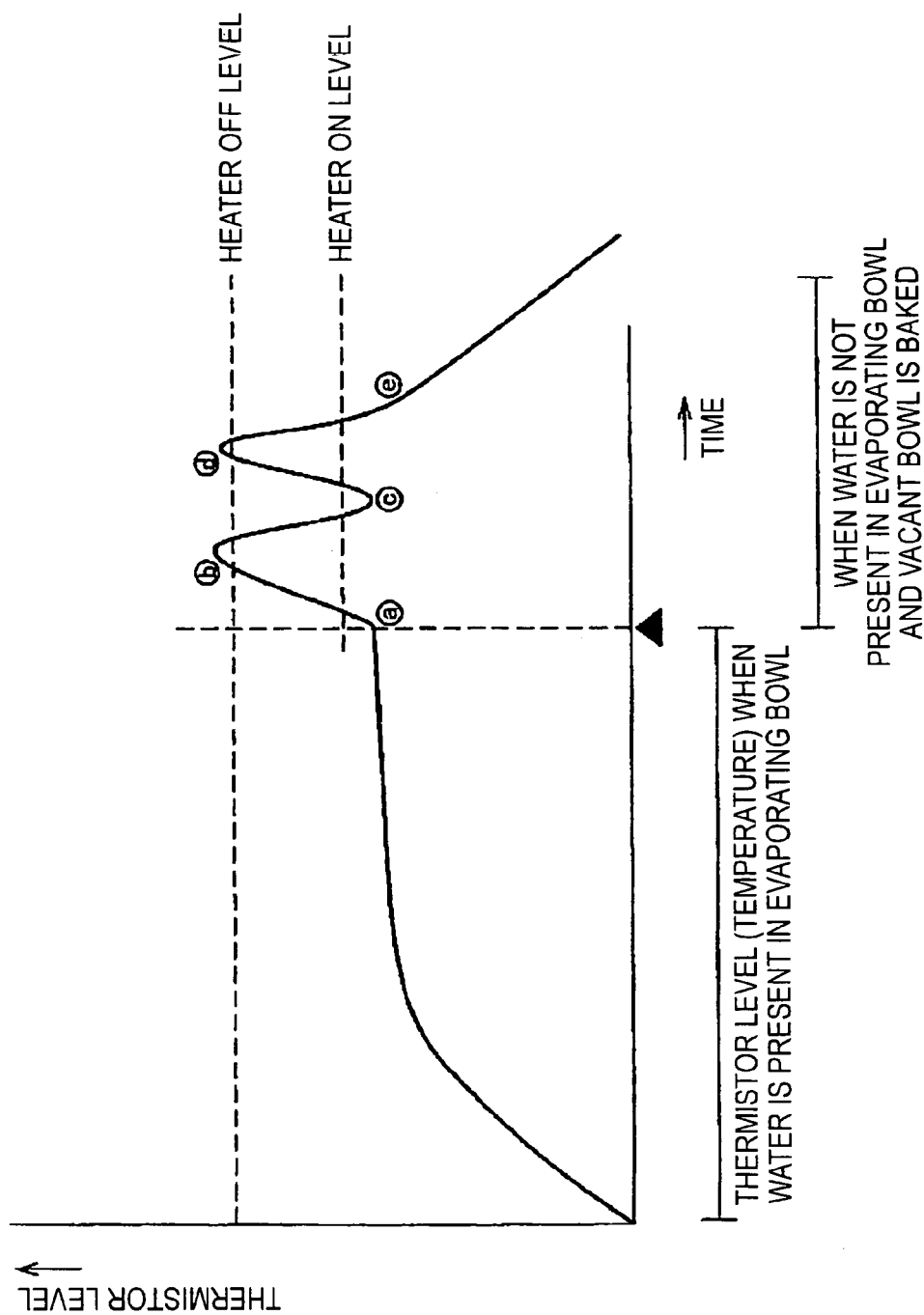
FIG. 10 is a diagram for explaining a control of an evaporation amount by a thermistor and detection of abnormality.

As shown by FIG. 10, a level of detected temperature of the thermistor 41 rises in accordance with a temperature rise of the heating means 27 when water is filled in the fed water receiving bowl (evaporating portion) 25 by filling water from the water storing tank 21. However, when there is not present water in the fed water receiving bowl (evaporating portion) 25 indicated by notation a in the drawing, since electricity is conducted to the heating means 27, a level of the detected temperature rapidly rises and exceeds an upper limit reference value indicated by notation b.

The control circuit, not illustrated, cuts electricity conduction to the heating means 27 at a time point of exceeding the upper limit reference value. At the time point, the detected temperature level of the thermistor 41 drops although there is overshooting. Some time later, at a time point at which the detected temperature level of the thermistor 41 reaches a lower limit reference value indicated by notation c, the control circuit heats the heater by conducting electricity to the heating means 27 again. However, since there is not present water in the fed water receiving bowl (evaporating portion) 25, the detected temperature level of the thermistor 41 rises again to exceed the upper limit reference value indicated by notation d. At the time point, the control circuit determines that there is not present water in the fed water receiving bowl (evaporating portion) 25 and the heating means 27 is brought into a state of baking a vacant bowl and executes a control of cutting electricity conduction to the heating means 27 as indicated by notation e and stopping a steam heating processing by issuing an alarm.

According to the embodiment, as described above, a steam amount can be controlled to generate and abnormality can be detected when there is not present water in the fed water receiving bowl (evaporating portion) by the single thermistor.

Further, by the above-described control, service life of the heater can be prolonged and a face of the fed water receiving bowl (evaporating portion) coated with fluororesin can be prevented from being deteriorated by enabling to use the fed water receiving bowl (evaporating portion) within heat resistant temperatures.

Further, although according to the embodiment, there is constructed the constitution in which it is determined that there is not present water in the fed water receiving bowl (evaporating portion) when the thermistor detects the temperature constituting the upper limit reference value twice by repeating a cycle of making the heater ON/OFF, a number of detection is not limited to twice but determination may be executed by detecting the temperature by a plurality of times.

Further, although according to the embodiment, the sheathed heater is used as the heating means 27, in place of the sheathed heater, a glass tube heater, a plate heater or the like can also be utilized.

As shown by FIG. 3 and FIG. 9, the water feeding path 29 is constituted by a base end pipe portion 29a connected to the connection port 22b of the water storing tank 21 by being branched to two routes, a horizontal pipe portion 29b arranged below the bottom plate 4 of the heating chamber 3 from the base end pipe portion 29a by way of the heating region by each heating means 27, a vertical pipe portion 29c vertically rising from a front end of the horizontal pipe portion 29b at a side of the heating chamber 3, an upper pipe portion 29d extended from an upper end of the vertical pipe portion 29c to an upper side of each fed water receiving bowl (evaporating portion) for dropping water pressurized from the vertical pipe portion 29c to the fed water receiving bowl (evaporating portion) 25, and the water blow out port 29e forming a front end of each upper pipe portion 29d.

As shown by FIG. 3, the horizontal pipe portion 29b is arranged to be brought into contact with the integrating block 27a of the heating means 27 and a contact portion 30 brought into contact with the integrating block 27a shown in FIG. 9 constitutes a heating region by the heating means 27.

Therefore, in two routes of the steam supply mechanism 7, mentioned above, it is shown that lengths from the respective contact portions 30 to the respective water blow out ports 29e are set to the equal distance.

According to the embodiment, in this way, the horizontal pipe portion 29b of each water feeding path 29 is set to the heating region by the heating means 27 and water is fed to each fed water receiving bowl (evaporating portion) 25 by boiling water in each horizontal pipe portion by receiving heat conduction by heat generated by each heating means 27.

Describing a behavior of generating steam further in details, in a state in which the water storing tank 21 is inserted to the tank containing portion 35 and water is filled at inside of the horizontal pipe portion 29b, when each heating means 27 generates heat, water is boiled by supplying heat to the water in the pipe at the contact portion 30 in contact with the integrated block 27a. Since the check valve 47 stops a pressure of water in the pipe, the pressure is directed only in the direction of the vertical pipe portion 29c. Further, the water level in the vertical pipe portion 29c rises by the pressure, the water passes through the upper pipe portion 29d and is dropped from each water blow out port 29e and is fed to the fed water receiving bowl (evaporating portion) 25.

At this occasion, even when bubbles are generated in boiling water at the contact portion 30 in contact with the integrated block 27, bubbles are moved to an air intake port (air exhausting portion) 29f provided upward from the contact portion 30 and is exhausted to outside from the water feeding path (transport tube) 29. When the air intake port (air exhausting portion) 29f is constituted at a topmost portion of the water feeding path (transport tube) 29, bubbles are going to move upward and therefore, bubbles can be exhausted further completely without staying in the water feeding path (transport tube) 29.

Further, since the distances from the contact portions 30 in contact with the integrated blocks 27a to the respective water blow out ports 29e are set to the equal distance, the same heat amount can be applied from the contact portions 30 to the respective horizontal pipe portions 29b by applying the heating means 27 having the same specification, thereby, water can be fed uniformly to the respective fed water receiving bowls (evaporating portions) 25.

Further, when the distances from the contact portions 30 to the respective water blow out ports 29e are set to the equal distance, temperatures of the respective water feeding paths 29 and the contact portions 30 can be made the same and the steam is made to be easy to be controlled to generate.

Water supplied to the fed water receiving bowl (evaporating portion) 25 is brought into a state in which temperature rises by heat generated by each heating means 27 and therefore, a time period required from feeding water to the fed water receiving bowl (evaporating portion) 25 to generate steam can be shortened and swift steam heating can be carried out.

When heating is interrupted, water in the vertical pipe portion 29c in each water feeding path 29 is not boiled, water cannot reach the air intake port 29f and the atmospheric pressure is brought from the air intake port 29f and water feeding is stopped.

As shown by FIG. 8(a), the base end pipe portion 29a is mounted with the cut-off valve 45 on the pipe side for preventing water from being leaked from the side of the horizontal pipe portion 29b when the water storing tank 22 is removed at a base end circular portion 43 fitted with the connection port 22b of the vessel main body 22 and is mounted with the cut-off valve 47 for preventing water from flowing back from the side of the horizontal pipe portion 29b by thermally expanding water at the horizontal pipe portion 29b (flow in a direction of an arrow mark (e) in the drawing) at the portion connected to the horizontal pipe portion 29b.

Directions of the cut-off valve 33 on the tank side and the cut-off valve 45 on the tank side of springs 33b, 45b for urging valve members 33a, 45a are inverse to each other and when the connection port 22b of the vessel main body 22 is properly fitted to the base end circular pipe portion 43, front end portions of the valve members 33a, 45a of the both members are butted to each other to displace counter parts against urge forces of the springs 33b, 45b to bring about a state of opening the flow path as shown by FIG. 8(b).

An outer peripheral portion of the connection port 22b of the vessel main body 22 is mounted with an O ring 49 as a seal member for closing a clearance between the outer peripheral portion and the base end circular tube portion 43.

A state shown in FIG. 8(a) is a state in which the connection port 22b of the vessel main body 22 is not fitted to the base end circular pipe portion 43 and a state in which both of the cut-off valve 33 on the tank side and the cut-off valve 45 on the pipe side close the flow path yet.

In the state in which the connection port 22b of the vessel main body 22 is disengaged from the base end circular pipe portion 43, the side of the water feeding path is sealed by the cut-off valve 45 on the pipe side and water in the water feeding path 29 can firmly be prevented from flowing back. That is, when as shown by FIG. 3, the water storing tank 21 is inserted to the tank containing portion 35, water flows into the vertical pipe portions 29c of the respective water feeding paths 29 by a water level the same as that of the water storing tank 21. Even when the water storing tank 21 is drawn out under the water pressure, water can be prevented from flowing back by the cut-off valve 45 on the pipe side.

A bottom portion on the rear face side of the tank containing portion 35 is mounted with a recess portion 51 for receiving dropping of a small amount of water remaining between the cut-off valve 33 on the tank side the cut-off valve 45 on the pipe side when the water storing tank 21 is drawn out from the tank containing portion 35, and the recess portion 51 is mounted with a water absorbing sheet 53 for absorbing dropped water. As the water absorbing sheet 53, for example, nonwoven cloth excellent in water absorbing performance is used.

Further, as shown by FIG. 3 and FIG. 4, an upper end of the vertical pipe portion 29c connected with the upper pipe portion 29d is set to a position higher than a highest level position Hmax of water stored in the water storing tank 21. This is for preventing water stored to the side of the water storing tank 21 from flowing out to the side of the upper pipe portion 29d unpreparedly and continuously by siphon operation.

Further, the water supplying path 29 is connected to the water storing tank 21 via the base end pipe portion 29a at a position lower than a lowest level Hmin of water stored in the water storing tank 21.

This is for enabling to take water stored in the water storing tank 21 to the side of the water feeding path 29 without leaving water at inside thereof.

In the case of the embodiment, the fed water receiving bowls (evaporating portions) 25 and the heating means 27 are respectively mounted to left and right sides of the rear portion of the bottom plate 4 of the heating chamber 3. Therefore, as shown by FIG. 4, two routes of the water feeding paths 29 are branched to two pieces of the horizontal pipe portions 29b respectively via the check valves 47, for example, downstream from the base end pipe portions 29a, the respective heating means 27 are laid with the contact portions 30 brought into contact with the horizontal pipe portions 29b. the vertical pipe portions 29c, the upper pipe portion 29d, the integrating blocks 27a for supplying heat of the heaters to water in the pipes, and according to the respective water feeding paths 29 mounted to the respective fed water receiving bowls (evaporating portions) 25, the distances from the contact portions 30 to the water blow out ports 29e at the front ends of the pipes are set to the equal distance.

According to the high frequency heating apparatus 100 having the steam generating function explained above, the water feeding path 29 is arranged by way of the heating region by the heating means 27 to thereby provide the pump function by thermally expanding water in the water feeding path 29 by heat generated by the heating means 27 and exclusive pump means for supplying water in the water storing tank 21 to the fed water receiving bowl (evaporating portion) 25 is not needed.

Therefore, simplification and small-sized formation of the constitution of the steam supply mechanism 7 can be realized by omitting the exclusive pump means.

Further, water is fed to the fed water receiving bowl (evaporating portion) 25 by the heat generated by the heating means 27 and therefore, an amount of supplying steam can be realized to control only by controlling operation of generating heat by the heating means 27, and in comparison with the constitution of the background art in which the exclusive pump means needs to be controlled, a control processing necessary for controlling the amount of supplying steam can simply be executed.

Further, water fed to the fed water receiving bowls (evaporating portion) 25 is brought into a state in which temperature thereof rises by the heat generated by the heating means 27 and therefore, a time period required for generating steam from when water has been supplied to the fed water receiving bowl (evaporating portion) 25 can be shortened and swift steam heating can be carried out.

Further, even when bubbles are generated by boiling water in the water feeding path (transport tube) 29 by the heat generated by the heating means 27, bubbles are exhausted to outside from the air intake port (air exhaust portion) 29f provided at the topmost portion of the water feeding path (transport tube) 29 and therefore, bubbles are prevented from staying in the water feeding path (transport tube) 29 and a stable liquid transporting function can be ensured.

Further, when in the above-described constitution, the remaining amount of the water storing tank 21 becomes 0 (null) and an amount of water remaining on the fed water receiving bowl (evaporating portion) 25 is reduced, the heat amount consumed for evaporating water is reduced and therefore, temperatures of the heating means 27 and the fed water receiving bowl (evaporating portion) 25 per se rise.

However, the steam supply mechanism 7 of the embodiment is provided with the thermistor 41 for detecting temperature of the heating means 27 and therefore, by monitoring the detected signal of the thermistor 41, null of the remaining amount of the water storing tank 21 can comparatively simply be detected and the drawback of baking the vacant bowl or the like can be prevented from being brought about.

Further, by utilizing the detected signal of the thermistor, for example, when null of the remaining amount of the water storing tank 21 is detected, various controls of stopping to operate the heating means 27 or issuing an alarm for feeding water or the like can be carried out and performance of handling the high frequency heating apparatus 100 can be promoted.

Further, although according to the embodiment, the thermistor 41 is brought into direct contact with the heating means 27, the thermistor 41 may be mounted to be brought into contact with the fed water receiving bowl (evaporating portion) 25.

Further, it is preferable to make supply per se of heated steam in the heating chamber 3 uniform by dispersingly mounting the steam generating portions constituted by the fed water receiving bowls (evaporating portions) 25 and the heating means 27 at a plurality of portions in the heating chamber 3 from a view point of preventing occurrence of a nonuniformity in heating by heated steam in the heating chamber of the high frequency heating apparatus having the steam generating function. However, when the steam generating portions are dispersingly mounted to a plurality of portions, it is necessary to devise to uniformly feed water to the fed water receiving bowls (evaporating portions) 25 at the plurality of portions.

However, in the case of mounting a plurality of sets of the fed water receiving bowls (evaporating portions) 25 and the heating means 27 as described above, when there is constructed a constitution in which according to the respective water feeding paths 29 mounted to the respective fed water receiving bowls (evaporating portions) 25, the distances from the contact portions of the heaters to the water blow out ports of the front ends of the pipes are set to the equal distance, even when flow rates of feeding water are not particularly controlled, supply amounts of the respective water feeding paths 29 can be made to be uniform and uniform supply of heated steam in the heating chamber 3 can inexpensively realized.

Figure 11:
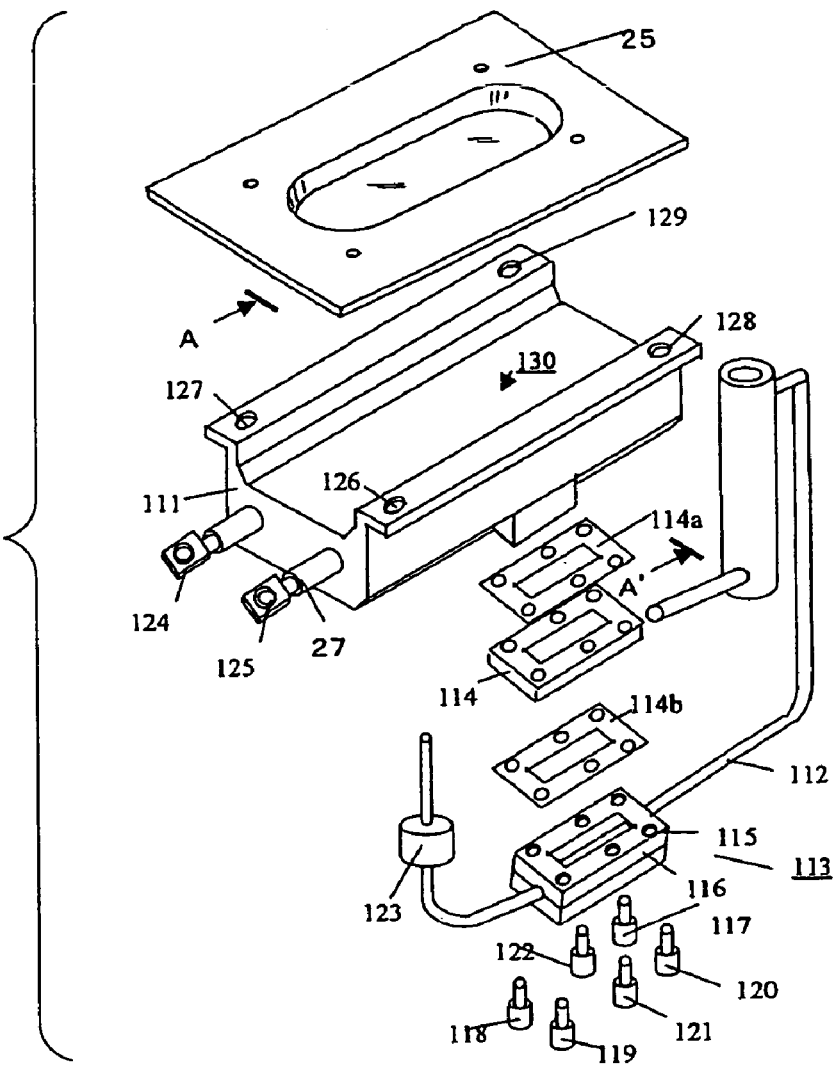
FIG. 11 is a disassembled perspective view of a steam supply mechanism according to Embodiment 1 of the invention.
Figure 12:
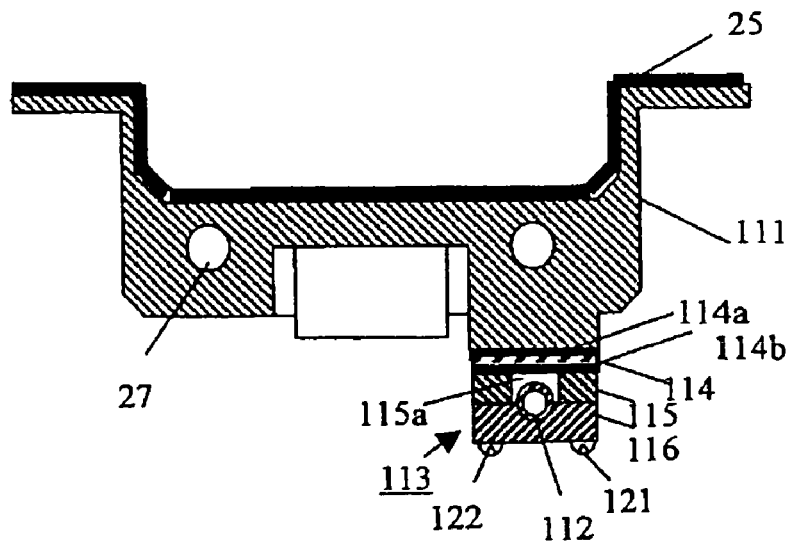
FIG. 12 is a sectional view taken along a line A-A' of FIG. 11.

FIG. 11 is a disassembled perspective view of the steam supply mechanism according to the first embodiment of the invention and FIG. 12 shows a sectional view taken along a line A-A' of FIG. 11.

In FIG. 11, FIG. 12, numeral 27 designates a sheathed water in a U-like shape constituting the heating means, numeral 111 designates a heating means main body constituted by aluminum diecast molding embedded with the heating means 27, numeral 112 designates a transport tube constituted by a material having a high heat conductivity of aluminum or copper, and numeral 113 designates a transport tube heating portion for boiling a liquid in the transport tube 112. Numeral 114 designates a heat conduction control portion which is arranged between the heating means main body 111 and the transport tube heating portion 113.

The transport tube heating portion 113 is constituted by two members 115, 116 and constituted to sandwich the transport tube 112 by the two members. The member 115 is provided with a notched portion 115a centering on a center portion in transport direction of the transport tube 112 and is brought into contact with the transport tube 112 at a lower half and both end of the sides of the transport tube 112.

As the heat conduction control portion 114, there is used a material having a conductivity lower than those of a material of molding the heating means main body 111 and a material of the transport tube 112 by one digit or more. Although iron, stainless steel or the like can be selected, stainless steel is selectively used in consideration of corrosion resistance. Further, in integrating the heat conduction control portion 114, between the heat conduction control portion 114 and the heating means main body 111 and between the heat conduction control portion 114 and the transport tube heating portion 113, there are interposed carbon sheets 114a, 114b having a higher heat conductivity characteristic in face direction (heat conductivity: 100 through 200 W/mk) rather than in a thickness direction (heat conductivity: 5 through 7 W/mK) to thereby exclude unnecessary restraint of heat conduction at a portion other than the heat conduction control portion 114.

On the other hand, the member 116 is constituted to be brought into contact with the transport tube 112 at all the region in the transport direction. The two members 115, 116 and the transport tube 112 are primarily integrated by screws 117, 118, 119, 120.

Further, a product primarily integrated by the transport tube 112 and the transport tube heating portion 113 are integrated to the heating means main body 111 via the heat conduction control portion 114 by using screws 121, 122.

Numeral 123 designates a check valve which is a part forming a heat transport portion provided on an upstream side of the transport tube heating portion 113 in a liquid transport direction, numerals 124, 125 designate wire connecting portions for connecting power supply lead wires of the sheathed heater 27, numerals 126 through 129 designate holes for attaching the heating means main body 111, numeral 130 designates a portion of conducting heat energy for evaporating the transported liquid. Numeral 25 designates the evaporating portion formed with a material a heat conductivity characteristic smaller than that of the heat conduction control portion 114, particularly, a material constituted by subjecting a steel plate whose major component is iron to a surface treatment of fluorine or the like.

Further, a side of the heating means main body 111 opposed to a direction of providing the transport tube 112 is used as a portion of conducting heat energy for evaporating the transported liquid.

With regard to the steam supply mechanism constituted as described above, a way of operating the mechanism and operation thereof will be explained as follows.

An explanation will be given by constituting liquid to be transported by water. First, a tank for storing water (not illustrated) is installed on a side of the check valve 123. Thereby, water is injected into the transport tube 112. Thereafter, the sheathed heater 17 is operated. In accordance with starting to operate the sheathed heater 27, the heating means main body 111 is heated and a temperature thereof rises. Heat of the heating means main body 111 is conducted to the main member 116 by way of the heat conduction control portion 114, the member 115 of the transport tube heating portion 113 while maintaining a uniform temperature distribution characteristic by interposing the carbon sheets 114a, 114b, and the transport tube 112 is heated. Local boiling of water is produced at a tube wall portion at a portion of the transport tube 112 at which a tube wall temperature exceeds 100° C. Bubbles generated in accordance with the boiling are expanded into a gas to push water in the transport tube 112 to both sides in the transport direction. The check valve 123 is arranged on the upstream side in the transport direction and the check valve 123 is brought into a closed state by being pushed by water in the transport tube 112. In accordance therewith, bubbles generated by the boiling escape only to the downstream side in the transport direction. In corporation with movement of the bubbles to a downstream side in the transport direction, the check valve 123 is brought into an opened state and water is injected into the transport tube 112 from the water storing tank. By repeating the phenomenon, water is transported. Transported water is guided to the evaporating portion 25 via the transport tube (not illustrated). The evaporating portion is constituted to be transferred the thermal energy from the heating means main body 111 and therefore, water transported to the evaporating portion is further heated to evaporate.

The transported water can immediately be evaporated by distributing the thermal energy supplied by the heating means main body 111 to a side of the transport tube and the side of the evaporating portion such that the side of the evaporating portion is distributed with the thermal energy by about 10 times as large as the thermal energy distributed to the side of the transport tube. In this case, when an amount of conducting heat to water is reduced in accordance with adherence of a scale to the side of the evaporating portion, the temperature of the heating means main body 111 rises. The heat conduction control portion 114 restrains an amount of conducting heat to the side of the transport tube heating portion 113 in correspondence with a temperature rise of the heating means main body 111, maintains the wall face temperature of the transport tube 112 at a substantially constant desired temperature (specifically, about 105 through 120° C. and maintains the thermal energy for local boiling in the transport tube 112 to be low, thereby, the adherence of the scale in the transport tube 112 can be restrained.

As a specific temperature example, when power of the sheathed heater is 600 W, the heat conduction control portion 114 is constituted such that when the temperature of the heating means main body 111 is 160° C., the temperature of the main member 116 becomes 105 through 110° C. The heat conduction control portion 114 comprises a stainless steel material having a plate thickness of 3 mm and a sectional area of 300 mm². When the scale piles up to a side of the evaporating portion under the condition, the temperature of the heating means main body 111 rises by 20 through 30° C., however, by the heat conduction control portion 114, the temperature of the main member 116 rises by less than 5° C.

Further, as shown by the drawing of the constitution of the embodiment, as a constitution of the transport tube heating portion 113, by arranging the main member 116 on the lower side in a direction of a gravitational force, bubbles produced by the boiling phenomenon in the transport tube 112 are moved to an upper side in the direction of the gravitational force. When bubbles are produced by boiling, the temperature of the inner wall face which is not exposed to water is going to be high immediately, however, by immediately making water flow to the boiling portion, temperature rise of the wall of the transport tube is restrained and adherence of scale can further be restrained.

Furthermore, by constituting the main member 116 to diffuse heat in a water transporting direction of the transport tube 112 and by using a material having the high heat conductivity of copper, aluminum, or the like of the transport tube, local boiling can be produced by small heat energy by previously heating water transported to the region of boiling and therefore, the adherence of scale can further be restrained.

Further, since a surface of the evaporating portion 25 is subjected to a water repelling treatment of fluorine or the like and therefore, a force of adhering the scale to the evaporating portion 25 is reduced and the scale can be removed and cleaned by wiping the scale by wet cloth or the like.

Embodiment 2

Figure 13:
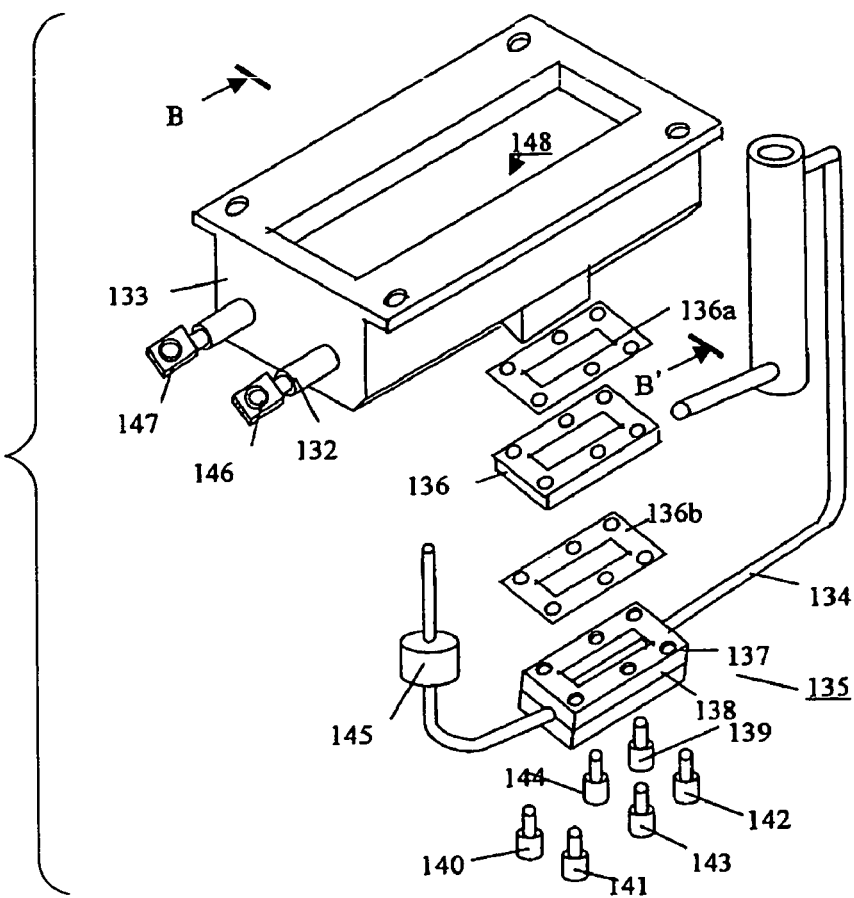
FIG. 13 is a disassembled perspective view of a steam supply mechanism according to Embodiment 2 of the invention.
Figure 14:
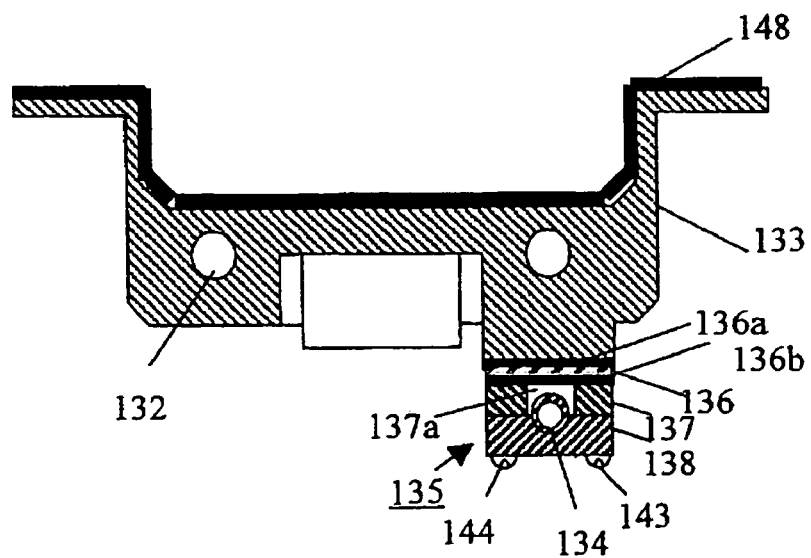
FIG. 14 is a sectional view taken along a line B-B' of FIG. 13.

FIG. 13 is a disassembled perspective view of a liquid evaporating apparatus according to a second embodiment of the invention, and FIG. 14 shows a sectional view taken along a line B-B' of FIG. 13. A point of Embodiment 2 which differs from Embodiment 1 resides in a constitution in which a recess portion is provided at an upper face of aluminum diecasting embedded with a sheathed heater to constitute an evaporating portion and that the evaporating portion is subjected to a water repelling treatment of fluorine or the like.

In FIG. 13, FIG. 14, numeral 132 designates a sheathed heater in a U-like shape constituting heating means, numeral 133 designates a heating means main body constituted by aluminum diecast molding embedded with the heating means 132, numeral 134 designates a transport tube constituted by a material having a high heat conductivity of aluminum or copper, and numeral 135 designates a transport tube heating portion for boiling a liquid in the transport tube 134. Numeral 136 designates a heat conduction control portion which is arranged between the heating means main body 133 and the transport tube heating portion 135.

The transport tube heating portion 135 is constituted by two members 137, 138 and constituted to sandwich the transport tube 134 by the two members. The member 137 is provided with a notched portion 137a centering on a center portion in a transport direction of the transport tube 134 and is brought into contact with the transport tube 134 at a lower half and both end sides of the transport tube 134.

There is used a material having a heat conductivity lower than those of a material of molding the heating means main body 133 and a material of the transport tube 134 by one digit or more for the heat conduction control portion 136. Although iron, stainless steel or the like can be selected, stainless steel is selectively used therefor in consideration of corrosion resistance. Further, in integrating the heat conduction control portion 136, between the heat conduction control portion 136 and a side of the heating means main body 133 and between the heat conduction control portion 136 and the transport tube heating portion 135, there are interposed carbon sheets 136a, 136b having a higher heat conductivity characteristic in a face direction (heat conductivity: 100 through 200 W/mK) rather than in a thickness direction (heat conductivity: 5 through 7 W/mK) to exclude unnecessary restraint of heat conduction at a portion other than the heat conduction control portion 136.

On the other hand, the member 138 is constituted to be brought into contact with the transport tube 134 at all the regions in the transport direction. The two members 137, 138 and the transport tube 133 are integrated by screws 139, 140, 141, 142.

Further, a product primarily integrated by the transport tube 134 and the transport tube heating portion 135 is integrated to the heating means main body 133 via the heat conduction control portion 136 by using screws 143, 144.

Numeral 145 designates a check valve provided on an upstream side of the transport tube heating portion 135 in a liquid transport direction, numerals 146, 147 designate wire connecting portions for connecting power supply lead wires of the sheathed heater 132, numeral 148 designates an evaporating portion provided in a recess shape at an upper face of aluminum diecast constituting the heating means main body 133, and a surface thereof is subjected to a water repelling treatment of fluorine or the like.

With regard to the vapor supply mechanism constituted as described above, way of operating the mechanism and operation thereof will be explained as follows.

According to Embodiment 2, the heating means main body 133 is integrally formed with the evaporating portion 148 and therefore, until water is transported to the evaporating portion 148, temperature of the heating means 133 and the temperature of the evaporating portion 148 become the same. When water is transported to the evaporating portion 148 and stored heating energy of the heating means main body 132 is consumed, an amount of heat conducted to the transport tube 134 is temporarily reduced, however, by continuously executing operation, amounts of conducting heat to the evaporating portion 148 and the transport tube 134 are balanced. Thereby, steam is generated stably. Further, since an efficiency of conducting heat from the evaporating portion 148 to transported water is excellent, water transported to the evaporating portion 148 can be vaporized in an extremely short period of time. Further, since an efficiency of conducting heat from the evaporating portion 148 to transported water is excellent, water transported to the evaporating portion 148 can be vaporized in an extremely short period of time.

Further, since the surface of the evaporating portion 148 is subjected to a water repelling treatment of fluorine or the like, an adherence force of the scale is reduced and the scale can be removed and cleaned by wiping the scale by wet cloth or the like.

Content other than the shape of the heating means main body 133 and the material of the evaporating portion 148 is similar to that in Embodiment 1 or Embodiment 2 and an explanation thereof will be omitted.

Embodiment 3

Figure 15:
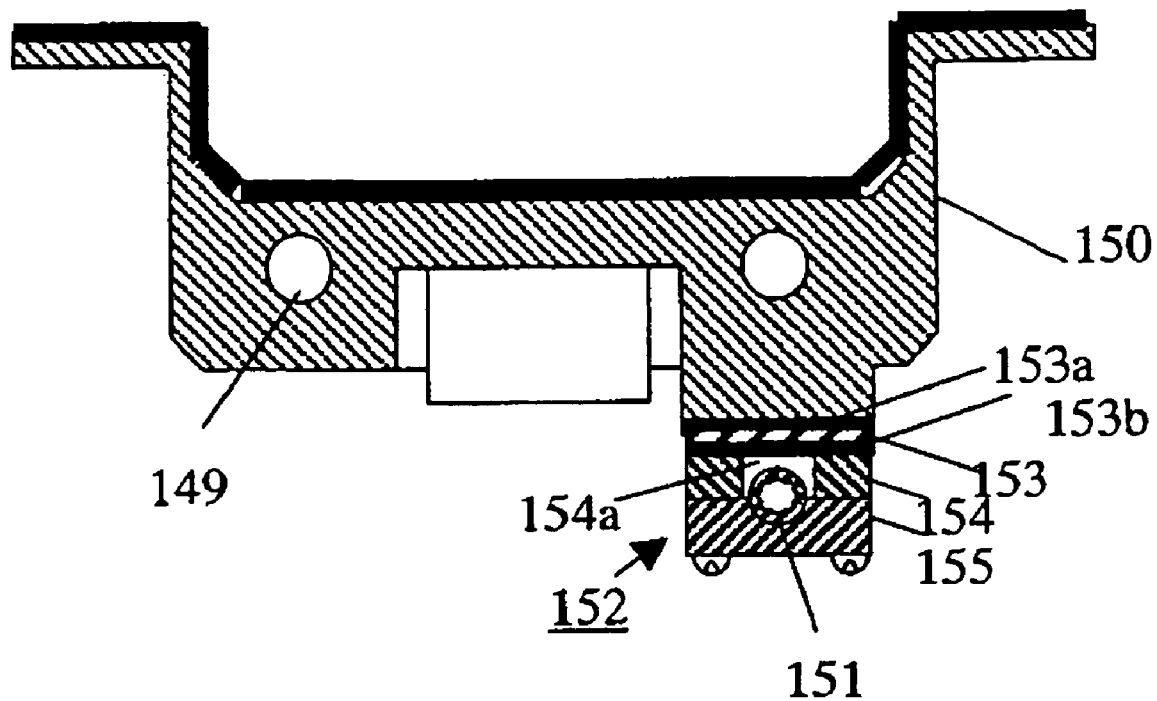
FIG. 15 is a sectional view of a transport tube including a transport tube heating portion and the like in Embodiment 3 of the invention.

FIG. 15 shows a sectional view of a transport tube including a transport tube heating portion and the like according to a third embodiment of the invention. A point of Embodiment 3 which differs from Embodiment 1 and Embodiment 2 resides in a shape by which a surface area on an inner side of the pipe is made to be larger than a surface area on an outer side of the pipe and that the inner side of the pipe is subjected to a water repelling treatment.

In FIG. 15, numeral 149 designates a sheathed heater in a U-like shape constituting heating means, numeral 150 designates heating means main body constituted by aluminum diecast molding embedded with the heating means 149, numeral 151 designates a transport tube comprising a material having a high heat conductivity of aluminum or copper and having a sectional area in a recessed and projected shape and subjecting a surface thereof to a water repelling treatment, and numeral 152 designates a transport tube heating portion for boiling a liquid in the transport tube 115. Numeral 153 designates a heat conduction control portion which is arranged between the heating means main body 147 and the transport tube heating portion 152.

According to Embodiment 3, since the surface of the transport tube 151 is subjected to a water repelling treatment of fluorine or the like, a contact angle thereof with water or the like is reduced and although a heat conduction performance is more or less reduced, adherence of scale or the like is also restrained. Thereby, clogging of the transport tube 151 by adhering the scale can be delayed. Further, when the scale in the transport tube 151 is removed by citric acid or the like, a function of cleaning the scale is promoted and the scale can be cleaned in a short period of time. Further, there is constructed a constitution in which a contact area of the transport tube 151 per unit amount of water in the pipe is larger and therefore, by gradually heating water, local boiling can be produced by small heat energy and therefore, adherence of the scale and emittance of boiling sound can further be restrained.

Content other than the transport tube 151 is similar to that of Embodiment 1 and an explanation thereof will be omitted.

Embodiment 4

Figure 16:
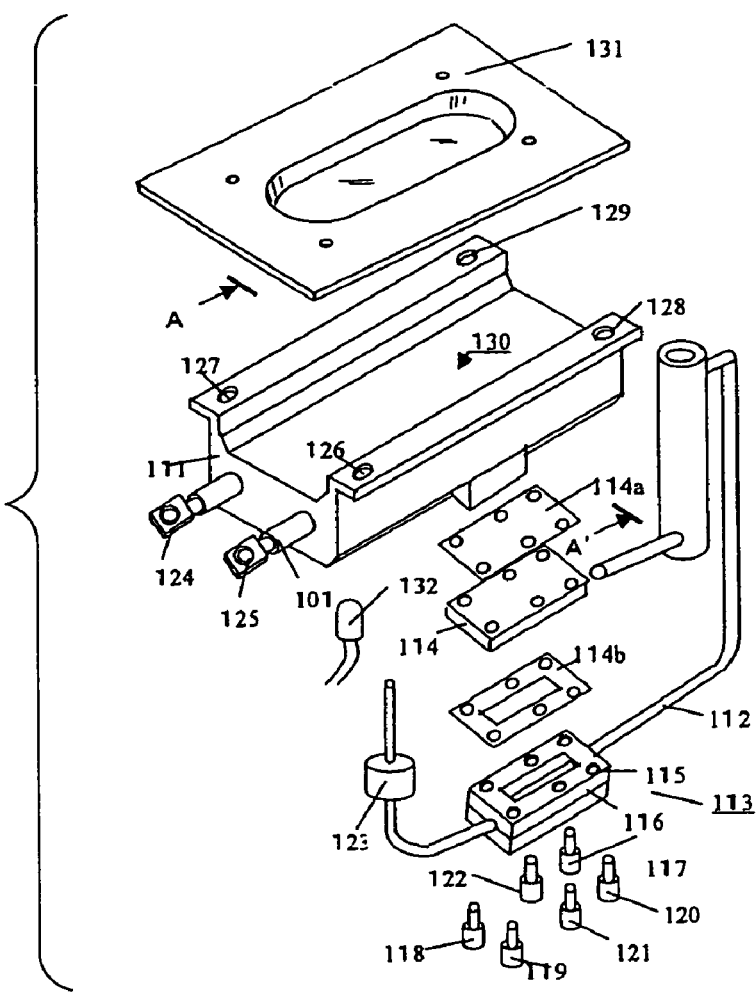
FIG. 16 is a disassembled perspective view of a steam supply mechanism according to Embodiment 4 of the invention.
Figure 17:
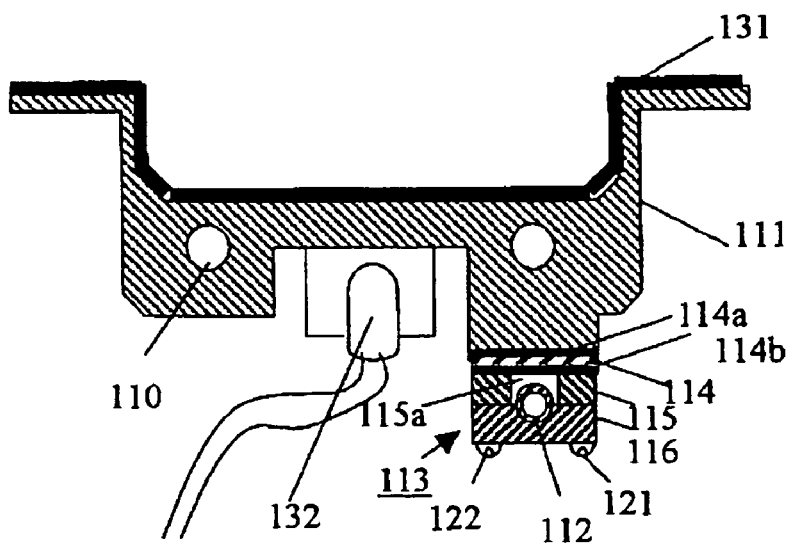
FIG. 17 is a sectional view taken along a line A-A' of FIG. 16.

FIG. 16 is a disassembled perspective view of a steam supply mechanism according to a fourth embodiment of the invention, and FIG. 17 shows a sectional view taken along a line A-A' of FIG. 16.

In FIG. 16, FIG. 17, numeral 101 designates a sheathed heater in a U-like shape constituting a heat source (heating means), numeral 111 designates a heat source main body constituted by aluminum diecast molding embedded with the heat source (heating means) 101, numeral 112 designates a transport tube forming a heat transport portion constituted by a material having a high heat conductivity of aluminum or copper, and numeral 113 designates a transport tube heating portion constituting the heat transport portion for boiling a liquid in the transport tube 112. Numeral 114 designates a heat conduction control portion which is arranged between the heat source main body 111 and the transport heating portion 113.

The transport tube heating portion 113 is constituted by two members 115, 116 and constituted to sandwich the transport tube 112 by the two members. The member 115 is provided with a notched portion 115a centering on a center portion in a transport direction of the transport tube 112 and is brought into contact with the transport tube 112 at a lower half and both end sides of the transport tube 112.

There is used a material having a heat conductivity lower than those of a material of molding the heat source main body 111 and a material of the transport tube 112 by one digit or more. Although iron, stainless steel or the like can be selected, stainless steel is selectively used in consideration of corrosion resistance. Further, in integrating the heat conduction control portion 114, between the heat conduction control portion 114 and a side of the heat source main body 111 and between the heat conduction control portion 114 and the transport tube heating portion 113, there are interposed carbon sheets 114a, 114b having a higher heat conductivity characteristic in a face direction (heat conductivity: 100 through 200 W/mK) rather than in a thickness direction (heat conductivity: 5 through 7 W/mK) to exclude unnecessary restraint of heat conduction at a portion other than the heat conduction control portion 14.

On the other hand, the member 116 is constituted to be brought into contact with the transport tube 112 at all the region in the transport direction. The two members 115, 116 and the transport tube 112 are primarily integrated by screws 117, 118, 119, 120.

Further, a product primarily integrated by the transport tube 112 and the transport tube heating portion 113 is integrated to the heat source main body 111 via the heat conduction control portion 114 by using screws 121, 122.

Numeral 123 designates a check valve which is a part forming a heat transport portion provided on an upstream side of the transport tube heating portion 113 in a liquid transport direction, numerals 124, 125 designate wire connecting portions for connecting power supply lead wires of the sheathed heater 101, and numerals 126 through 129 designate holes for attaching the heat source main body 111.

Numeral 130 designates a portion for conducting heat energy for evaporating the transported liquid, which is used as a portion of conducting heat energy for evaporating the liquid transported to a side of the heat source main body 111 opposed to a direction of providing the transport tube 112.

Numeral 131 designates an evaporating portion formed by a material having a heat conductivity characteristic smaller than that of the heat conduction control portion 114, particularly a material constituted by subjecting a steel plate whose major component is iron to a surface treatment of fluorine or the like in a recess shape on an upper side thereof.

Further, numeral 132 designates a thermistor attached to a side of a lower face of the heat source main body for detecting a temperature of the heat source main body 132 and a temperature control is carried out by controlling to conduct electricity to the heat source main body 111 by a temperature control portion (not illustrated) by an output signal of the thermistor 132.

With regard to the steam supply mechanism constituted as described above, way of operating the mechanism and operation thereof will be explained as follows.

An explanation will be given by constituting a liquid to be transported by water. First, a tank for storing water (not illustrated) is installed on a side of the check valve 123. Thereby, water is injected into the transport tube 112. Thereafter, the sheathed heater 101 is operated. In accordance with starting to operate the sheathed heater 101, the heat source main body 111 is heated and temperature rises. Heat of the heat source main body 111 is transmitted to the main member 116 by way of the heat conduction control portion 114, the member 115 of the transport tube heating portion 113 while maintaining a uniform temperature distribution characteristic by interposing the carbon sheets 114a, 114b, and the transport tube 112 is heated. Local boiling of water is produced at a tube wall portion at a portion at which a tube wall temperature of the transport tube 112 exceeds 100° C. Bubbles produced in accordance with the boiling are expanded into a gas to push water in the transport tube 112 to both sides in the transport tube direction. The check valve 123 is arranged on an upstream side in the transport direction and the check valve 123 is brought into a closed state by being pushed by water in the transport tube 112. In accordance therewith, bubbles produced by boiling are escaped only to a downstream side in the transport direction. In corporation with movement of the bubbles to the downstream side in the transport direction, the check valve 123 is brought into an opened state and water is injected from the water storing tank into the transport tube 12. By repeating the phenomenon, water is transported. Transported water is guided to the evaporating portion 131 via the transport tube 112. There is constructed a constitution in which heat energy is transmitted from the heat source main body 111 to the evaporating portion and therefore, water transported to the evaporating portion is further heated to evaporate.

Figure 18:
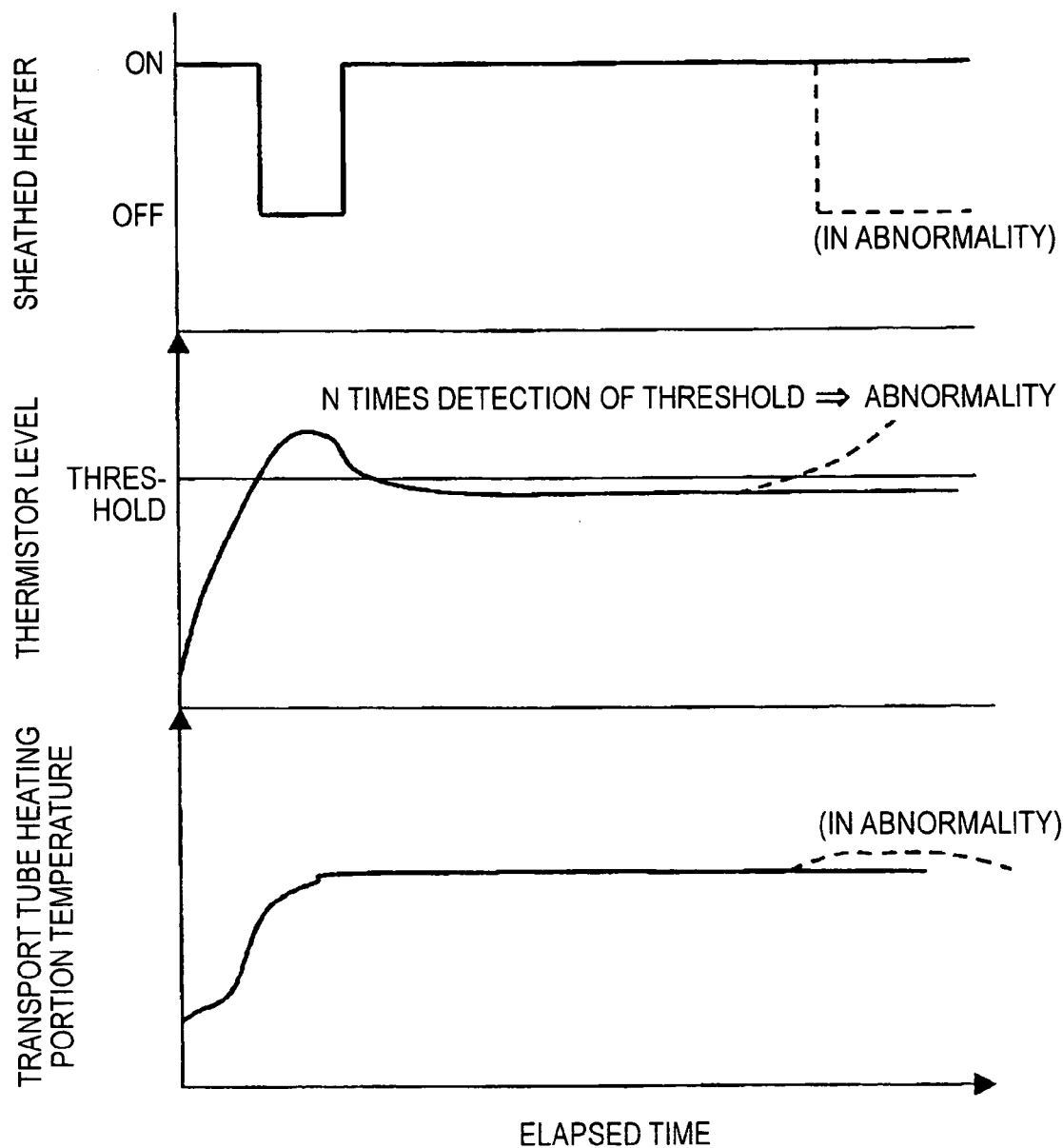
FIG. 18 is a sequence diagram showing a thermistor detecting level and a state of operating a heat source (heating means) according to Embodiment 4 of the invention.

Further, at this occasion, a temperature of the heat source main body 111 is detected by the thermistor 132 and the temperature of the heat source main body 111 is controlled and therefore, an amount of heat conducted to the heat conduction control portion 114 is restricted. Thereby, an amount of conducting heat to water filled at inside of the transport tube 112 is restricted and a supply amount to the evaporating portion 131 is stabilized. Further, when water fed from the water storing tank into the transport tube 112 is reduced, an amount of conducting heat to water is reduced, a temperature of the heat source main body 111 rises, however, electricity conduction to the sheathed heater 101 is stopped by the temperature control and shortage of water can also be detected by a situation of changing a signal level of the thermistor 132. FIG. 18 shows the signal level of the thermistor 132 and a state of conducting electricity to the sheathed water 101.

In distributing heat energy supplied by the heat source main body 111 to a side of the transport tube and a side of the evaporating portion, by distributing heat energy to the side of the evaporating portion by about 10 times larger than heat energy distributed to the side of the transport tube, transported water can immediately be evaporated. In this case, when an amount of conducting heat to water is reduced in accordance with adherence of scale to the side of the evaporating portion, a temperature of the heat source main body 111 rises. The heat conduction control portion 114 can restrain adherence of scale in the transport tube 112 by restraining the amount of conducting heat to the side of the transport tube heating portion 113 in correspondence with a temperature rise of the heat source main body 111, maintaining a wall face temperature of the transport tube 112 at a substantially constant desired temperature (specifically, about 105 through 120° C.) and maintaining heat energy of local boiling in the transport tube 112 to be low.

As a specific temperature example, in the case in which power of the sheathed heater is 620 W, the heat conduction control portion 114 is constituted such that when the temperature of the heat source main body 111 is 200° C., a temperature of the main member 116 becomes 105 through 120° C. The heat conduction control portion 114 comprises a stainless steel material having a plate thickness of 2 mm and a sectional area of 300 mm². When the scale piles up to a side of the evaporating portion under the condition, the temperature of the heat source main body 111 rises by 20 through 30° C., however, by the heat conduction control portion 114, the temperature of the main member 116 rises by about 5° C.

Further, adherence of scale can further be restrained since local boiling is produced by small heat energy by previously heating water transported to the region of boiling by constituting the main member 116 to diffuse heat in the water transport direction of the transport tube 112 or by using a material having a high heat conductivity of copper, aluminum or the like for the transport tube.

Further, since the surface of the evaporating portion 131 is subjected to the water repelling treatment of fluorine or the like, a force of a scale of adhering to the evaporating portion 131 is reduced, the scale can be removed and cleaned by wiping the scale by wet cloth or the like and further, by controlling a temperature of the heat source main body 111, also a surface of the evaporating portion 131 subjected to the water repelling treatment can be protected.

Embodiment 5

Figure 19:
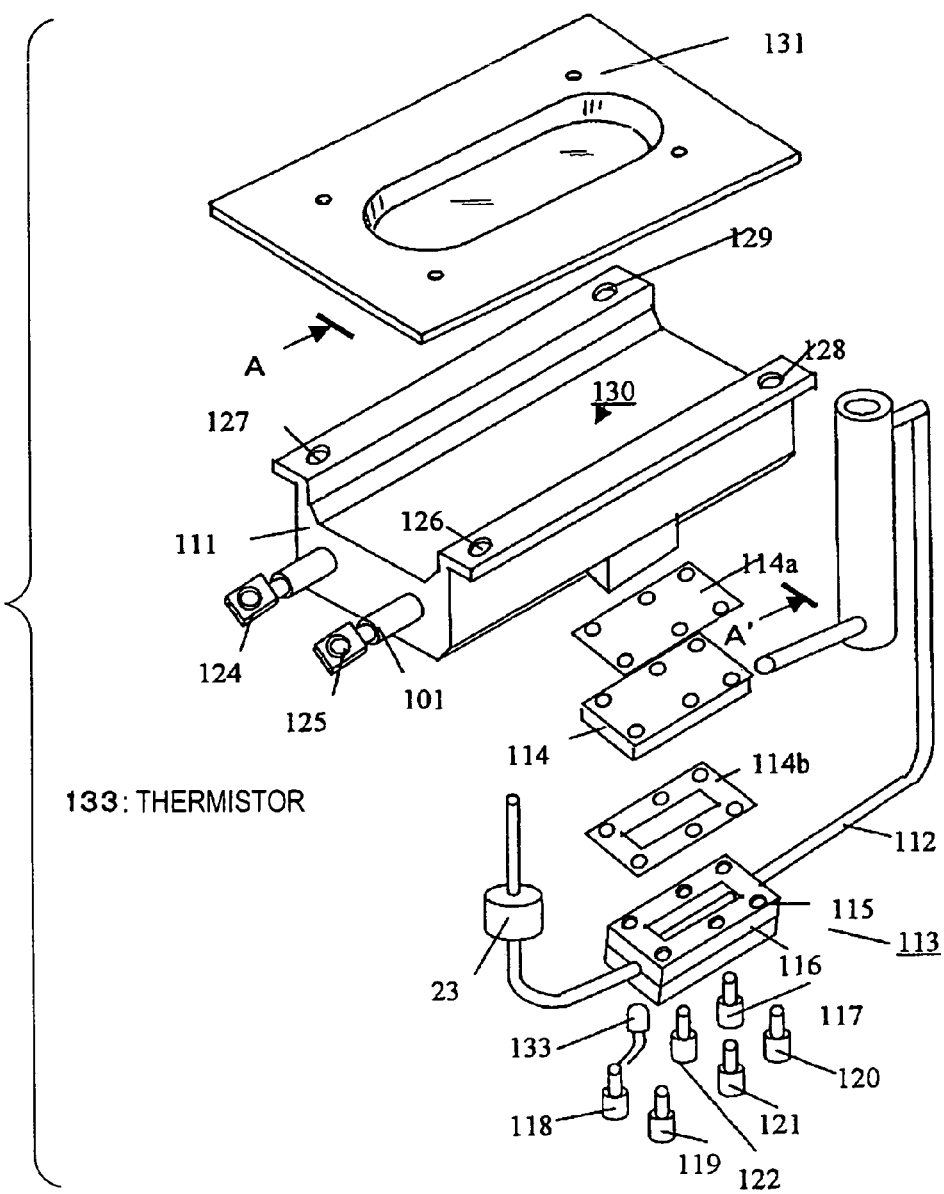
FIG. 19 is a disassembled perspective view of a steam supply mechanism according to Embodiment 5 of the invention.
Figure 20:
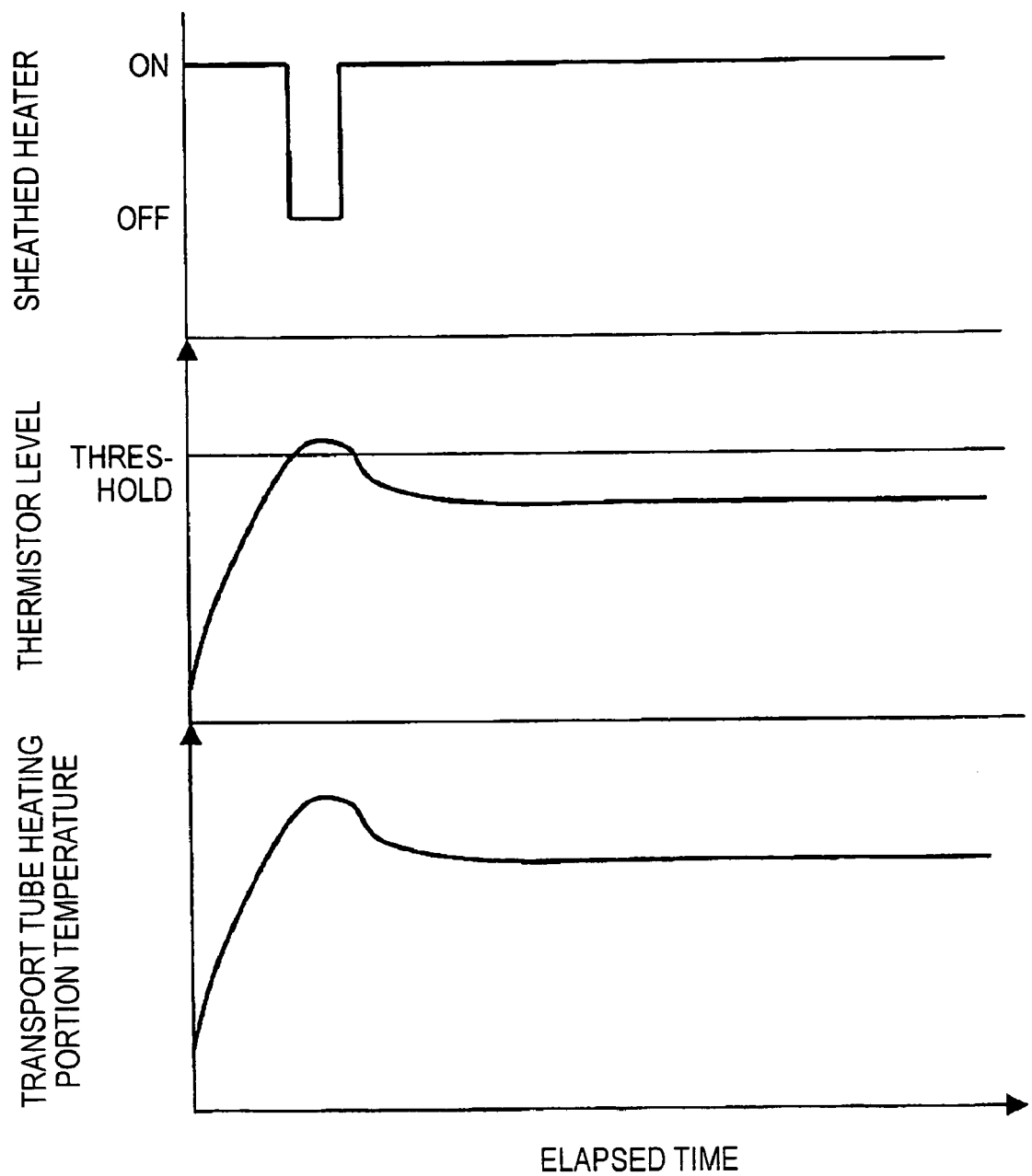
FIG. 20 is a sequence diagram showing a thermistor detecting level and a state of operating a heat source (heating means) according to Embodiment 5 of the invention.

FIG. 19 shows a disassembled perspective view of a steam supply mechanism according to a fifth embodiment of the invention. A point of Embodiment 2 which differs from Embodiment 1 resides in that the thermistor 133 is attached to the pipe heating portion 113 and by detecting the temperature of the pipe heating portion 113, electricity conduction control of the sheathed heater is executed.

At this occasion, the temperature control of the heat source main body 111 is carried out by detecting the temperature of the pipe heating portion 113 and therefore, a change in the temperature of the transport tube 112 is immediately detected and an amount of conducting heat to the heat conduction control portion 114 can be restricted by controlling electricity conduction of the sheathed heater 101.

Thereby, the amount of heat conducted to water filled at inside of the transport tube 112 is restricted, a supply amount to the evaporating portion 131 is stabilized, the temperature rise in the transport tube 112 can be reduced and adherence of scale can be reduced. Further, shortage of water in the water storing tank can also be detected. FIG. 15 shows a signal level of the thermistor 133 and a state of conducting electricity to the sheathed heater 101.

Content other than the thermistor 131 is similar to that of Embodiment 4 and an explanation thereof will be omitted.

Embodiment 6

Figure 21:
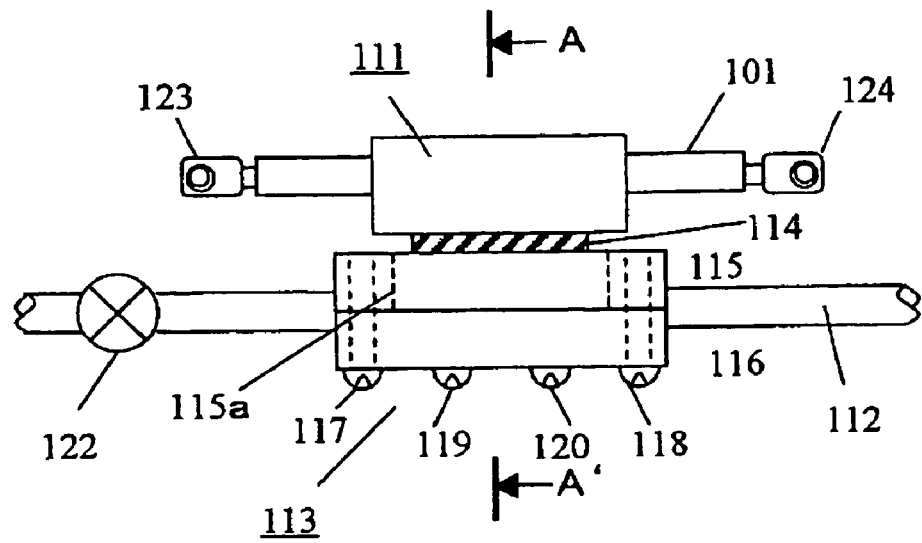
FIG. 21 is a constitution view of a steam supply mechanism according to Embodiment 6 of the invention.
Figure 22:
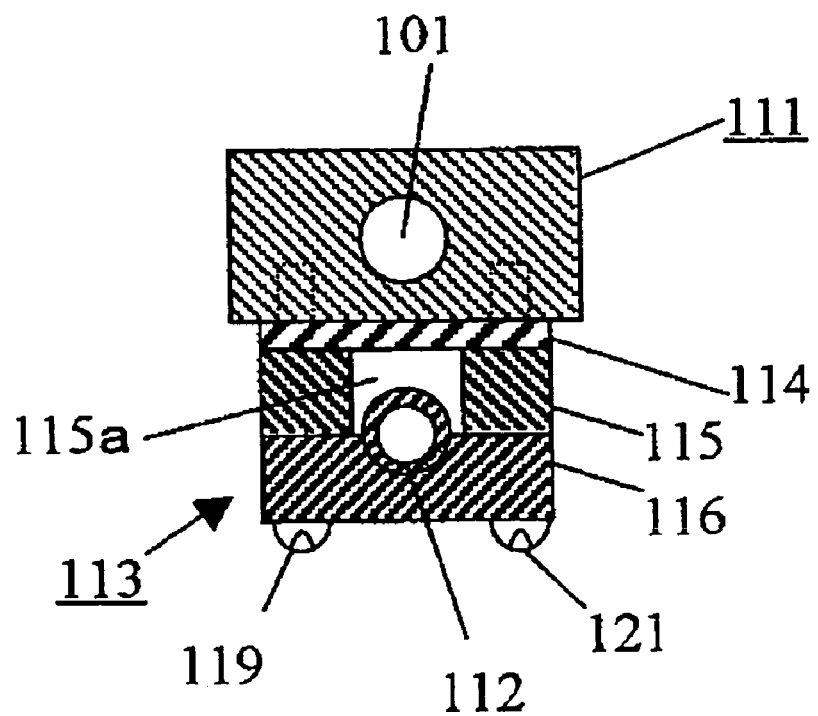
FIG. 22 is a sectional view taken along a line A-A' of FIG. 21.

FIG. 21 is a constitution view of a steam supply mechanism according to a sixth embodiment of the invention and FIG. 22 shows a sectional view taken along a line A-A' of FIG. 21.

In FIG. 21, FIG. 22, numeral 101 designates a sheathed heater constituting heating means, numeral 111 designates a heat source main body embedded with the heating means 101, numeral 112 designates a transport tube constituted by a material having a high heat conductivity of aluminum or copper, and numeral 113 designates a heating portion for boiling a liquid in the transport tube 112. The heat source main body 111 is constituted by diecast molding using an aluminum material. Numeral 114 designates heat conduction amount restraining means which is arranged between the heat source main body 111 and the heating portion 113. The heating portion 113 is constituted by two members 115, 116 and is constituted to sandwich the transport tube 112 by the two members. The member 115 is provided with a slit portion 115a centering on a center portion in a transport direction of the transport tube 112 and is brought into contact with the transport tube 112 only at both end sides thereof On the other hand, the member 116 corresponds to a main body according to the invention and is constructed by a constitution in which all the area in the transport direction is brought into contact with the transport tube 112. The two members 115, 116 and the transport tube 112 are integrated by screws 117, 118.

Further, the heating portion 113 integrally integrated with the transport tube 112 is integrated to the heat source main body 111 via the heat conduction restraining means 114 by using screws 119, 120, 121.

Numeral 122 designates a check valve provided on an upstream side of the heating portion 113 in a liquid transport direction, and numerals 123, 124 designate wire connecting portions for connecting power supply lead wires of the sheathed heater 101.

There is used a material having a heat conductivity lower than those of a material of molding the heat source main body 111 and a material of the transport tube 112 by one digit or more for the heat conduction amount restraining means 114. Although iron, stainless steel or the like can be selected, stainless steel is selectively used in consideration of corrosion resistance. Further, in integrating the heat conduction amount restraining means 114, between the heat conduction amount restraining means 114 and a side of the heat source main body 111 and between the heat conduction amount restraining means 114 and the heating portion 113, silicone grease or a carbon sheet or the like is interposed to exclude unnecessary restraint of heat conduction at a portion other than the heat conduction amount restraining means 114

Further, a side of the heat source main body 111 opposed to a direction of providing the transport tube 112 is used as a portion of conducting heat energy for evaporating transported liquid.

With regard to the steam supply mechanism constituted as described above, way. of operating the mechanism and operation thereof will be explained as follows.

An explanation will be given by constituting the liquid to be transported by water. Further, a tank for storing the water (not illustrated) is installed on a side of the check valve 122. Thereby, water is injected into the transport tube 112. Thereafter, the sheathed heater 101 is operated. In accordance with starting to operate the sheathed heater 101, the heat source main body 111 is heated and the temperature rises. Heat of the heat source main body 111 is conducted to the main member 116 via the heat conduction amount restraining means 114, the member 115 of the heating portion 113 and the transport tube 112 is heated. Local boiling of water is produced at a tube wall portion at a portion at which a tube wall temperature of the transport tube 112 exceeds 100° C. Bubbles generated in accordance with boiling are expanded into a gas to push water in the transport tube 112 to both sides of the transport direction. The check valve 122 is arranged on the upstream side of the transport direction and the check valve 122 is brought into a closed state by being injected by water in the transport tube 112. In accordance therewith, bubbles produced by boiling are escaped only to a downstream side in the transport direction. In corporation with movement of the bubbles to the downstream side in the transport direction, the check valve 122 is brought into a closed state and water is injected from the water storing tank into the transport tube 112. By repeating the phenomenon, water is transported. Transported water is guided to a so-to-speak evaporating portion (not illustrated). There is constructed a constitution in which heat energy is transmitted from the heat source main body 111 to the evaporating portion and therefore, water injected to the evaporating portion is further heated to evaporate.

In distributing heat energy supplied by the heat source main body 111 to a side of the transport tube and a side of the evaporating portion, by distributing heat energy to the side of the evaporating portion by about 10 times as large as thermal energy to the side of transport tube, transported water can immediately be evaporated. In this case, when an amount of heat conducted to water is reduced in accordance with adherence of scale to the side of the evaporating portion, a temperature of the heat source main body 111 rises. The heat conduction amount restraining means 114 can restrain adherence of scale into the transport tube 112 by restraining an amount of conducting heat to a side of the heating portion 113 relative to the temperature rise of the heat source main body 111, maintaining a wall face temperature of the transport tube 112 at a substantially constant desired temperature (specifically, equal to or lower than 110° C.) and maintaining thermal energy of local boiling in the transport tube 112 to be low.

As a specific temperature example, in the case in which power of the sheathed heater is 600 W. the heat conduction amount restraining means 114 is constituted such that when the temperature of the heat source main body 111 is 160° C., the temperature of the main member 116 becomes 105 through 110° C. The heat conduction amount restraining means 114 comprises a stainless steel material having a plate thickness of 3 mm and a sectional area of 300 mm$^2$. When the scale piles up on the side of the evaporating portion under the condition, a temperature of the heat source main body 111 rises by 20 through 30° C., however, by the heat conduction amount restraining means 114, a temperature of the main body 116 rises by less than 5° C.

Further, as shown by the constitution drawing of the embodiment, as the constitution of the heating portion 113, by arranging the main member 116 on a lower side in a direction of a gravitational force, bubbles produced by the boiling phenomenon in the transport tube 112 are moved to an upper side in the gravitational force direction. When bubbles are produced by boiling, a temperature of an inner wall face which is not exposed to water is going to be a high temperature immediately, adherence of scale can further be restrained by restraining rise of the wall face temperature of the transport tube by immediately making water flow into the portion of the boiling.

Furthermore, adherence of scale can further be restrained since local boiling can be produced by small heat energy by previously heating water transported to a region of the boiling by constituting the main member 116 to diffuse heat in the water transport direction of the transport tube 12.

Embodiment 7

Figure 23:
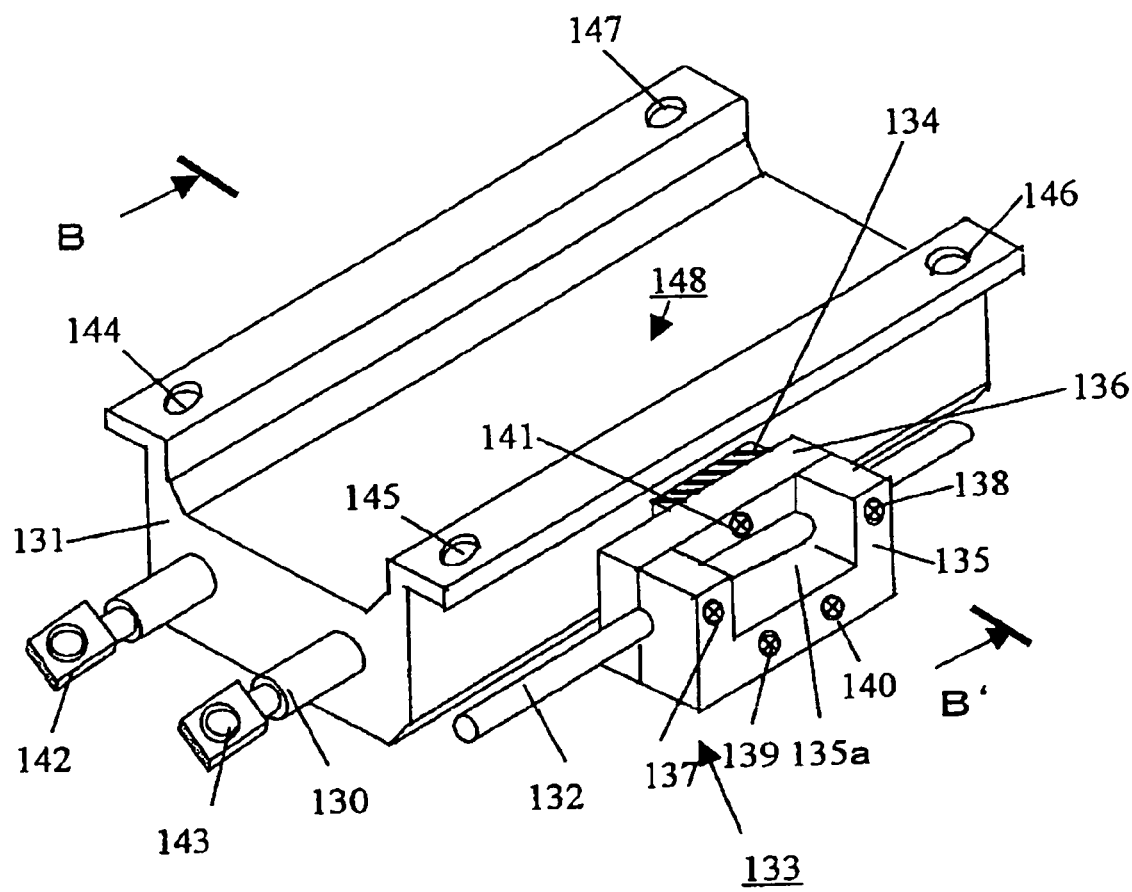
FIG. 23 is an outlook view of a steam supply mechanism according to Embodiment 7 of the invention.
Figure 24:
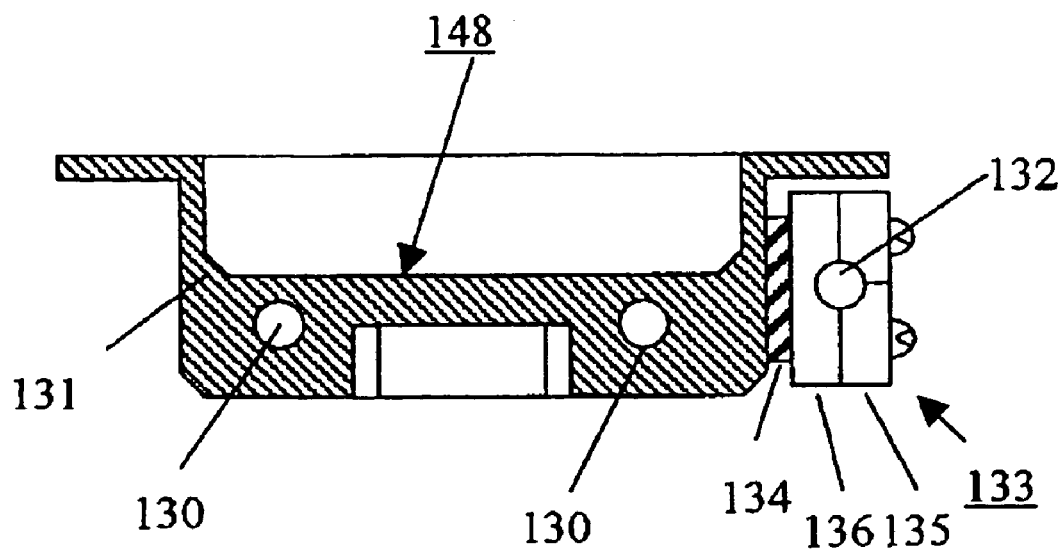
FIG. 24 is a sectional view taken along a line B-B' of FIG. 23.

FIG. 23 is an outlook view of a steam supply mechanism according to a seventh embodiment of the invention, and FIG. 24 shows a sectional view taken along a line B-B' of FIG. 23. A point of Embodiment 2 which differs from Embodiment 1 resides in enlarging an area of conducting heat to a side of an evaporating portion and a constitution in which a transport tube is attached to a heat source main body.

In FIG. 23, FIG. 24, numeral 130 designates a sheathed heater in a U-like shape constituting heating means, numeral 131 designates a heat source main body constituted by aluminum diecast molding embedded with the heating means 130, numeral 132 designates a transport tube constituted by a material having a high heat conductivity of aluminum or copper, and numeral 133 designates a heating portion for boiling a liquid in the transport tube 132. Numeral 134 designates heat conduction amount restraining means which is arranged between the heat source main body 131 and the heating portion 133. The heating portion 133 is constituted by two members 135, 136 and is constituted by sandwiching the transport tube 132 by the two members. The member 135 is provided with a notched portion 135a centering on a center portion in a transport direction of the transport tube 132 and is brought into contact with the transport tube 132 at a lower half and both end sides of the transport tube 132. On the other hand, the member 136 is constituted to be brought into contact with the transport tube 132 at all the region in the transport direction. The two members 135, 136 and the transport tube 132 are primarily integrated by screws 137, 138.

Further, a product primarily integrated by the transport tube 132 and the heating portion 133 are integrated to the heat source main body 131 via the heat conduction amount restraining means 134 by using screws 139, 140, 141.

Numerals 142, 143 designate wire connecting portions for connecting power supply lead wires of the heater 130, numerals 144 through 147 designate holes for attaching the heat source main body 131, and numeral 148 designates a portion of conducting heat energy for evaporating a transported liquid.

Content with regard to a material and integration of the heat conduction amount restraining means 134 is similar to that of Embodiment 6 and an explanation thereof will be omitted.

According to the steam supply mechanism constituted as described above, by enlarging the area of conducting heat energy to a side of the evaporating portion, a reduction in the heat conduction amount in accordance with adherence of scale at the evaporating portion can be alleviated and therefore, the liquid can be transported and the transported liquid can be operated to evaporate further stably. Further, by constructing a constitution in which heat from the heat source main body 131 is conducted from a direction of a side face of the transport tube 132, bubbles produced by boiling in the transport tube 132 can immediately be moved to an upper side in the gravitational force direction. Although when the bubbles are produced, a temperature of an inner wall which is not exposed to water is immediately going to be a high temperature, since bubbles are easily moved to the upper side, the liquid can immediately be made to flow into the portion of the boiling and adherence of scale can further be restrained by restraining rise of the wall face temperature of the transport tube. Further, by providing the large notched portion 135a by the member 135 constituting the heating portion 133, the heat conduction amount restraining means 134 and the heating portion 133 can easily be integrated to the heat source main body 131.

Embodiment 8

Figure 25:
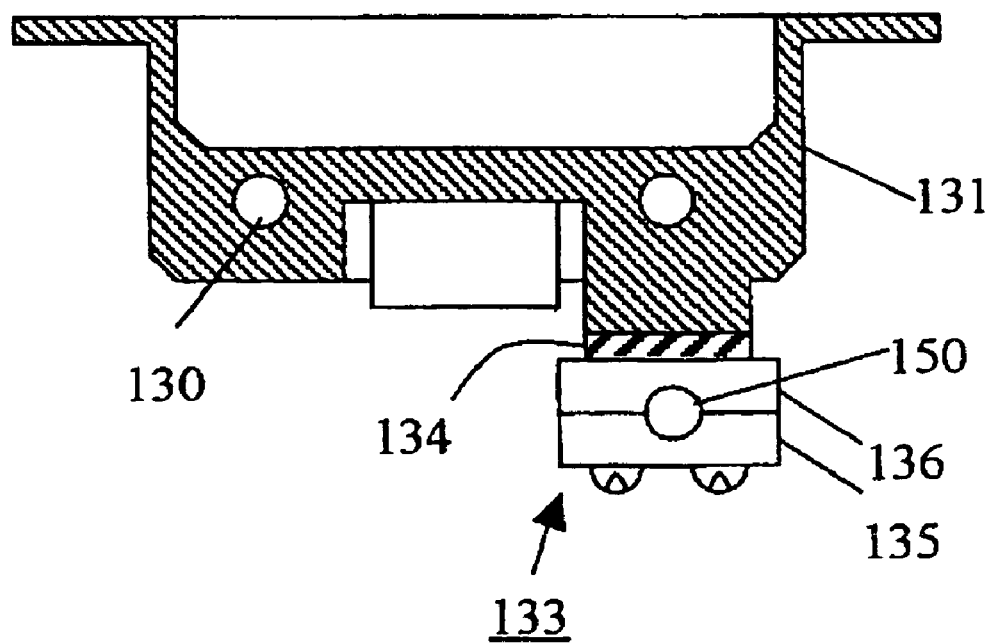
FIG. 25 is a constitution view of a steam supply mechanism according to Embodiment 8 of the invention.

FIG. 25 shows a sectional view of a steam supply mechanism showing an eighth embodiment of the invention. Further, corresponding members the same as those or having the same functions of Embodiment 7 are designated by the same numerals.

A point of FIG. 25 which differs from Embodiment 7 resides in that the transport tube 150 is arranged on a lower side of the heat source main body 131. In this way, arrangement of the transport tube to the same heat source main body can freely be selected by using the heat conduction amount restraining means.

Embodiment 9

Figure 26:
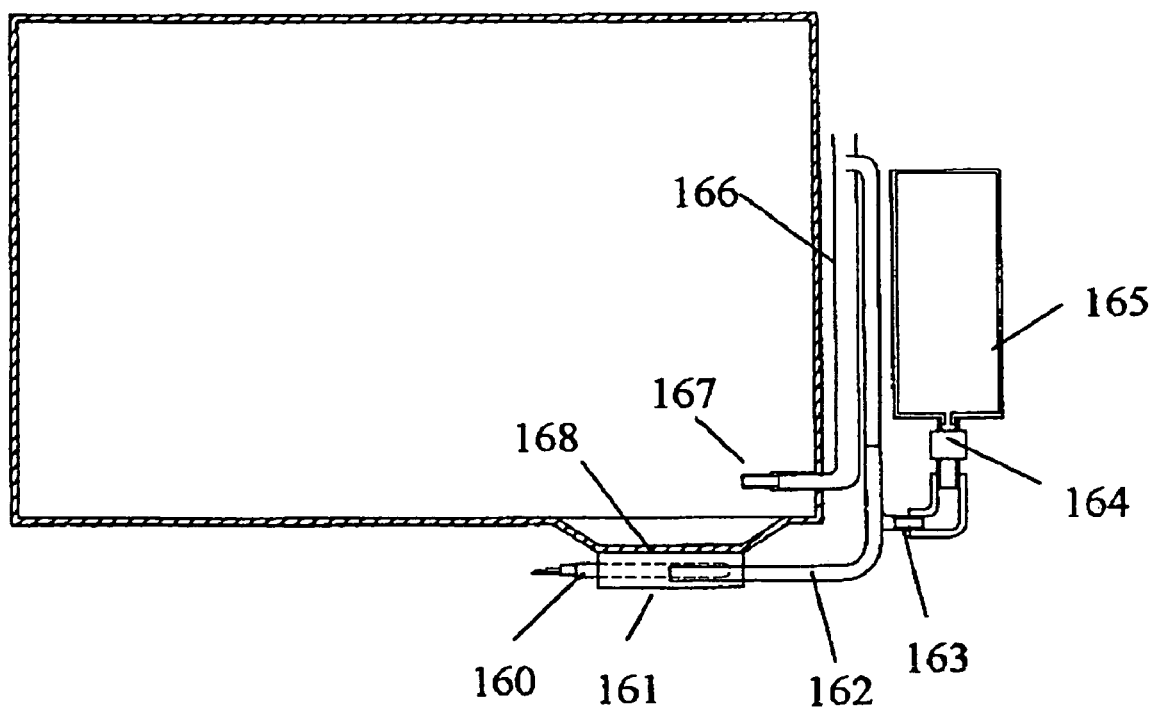
FIG. 26 is a constitution view of a steam supply mechanism according to Embodiment 9 of the invention.

FIG. 26 shows a constitution view of a steam supply mechanism showing a ninth embodiment of the invention.

In FIG. 26, numeral 160 designates a sheathed heater which is heating means, numeral 161 designates a heat source main body integrally molded with the sheathed heater 160, numeral 162 designates a heat pipe which is heat conduction amount restraining means one end of which is brought into contact with a side face of the heat source main body 161 and other end of which is brought into contact with a transport tube 163. A liquid tank 165 is arranged on an upstream side in a transport direction of the transport tube 163 via a check valve 164. Further, a downstream side of the transport tube 163 is provided with a delivery port 167 which is opened to the atmosphere via a pipe 166 connected thereto. Numeral 168 designates an evaporating portion for storing a transported liquid and is formed by drawing a sheet metal. The heat source main body 161 is brought into contact with the drawn evaporating portion 168.

Further, numeral 169 designates a heating chamber for containing a heated object adopting a mode in which the contained heated object is heated by utilizing steam generated by the evaporating portion 68.

According to the steam supply mechanism constituted as described above, by using the heat pipe 162 for the heat conduction amount restraining means and using water for a working fluid of the heat pipe, a portion of heating the transport tube corresponds to a condensing portion of the heat pipe and heat can be conducted to the transport tube at a maximum temperature of 100° C. Thereby, adherence of scale in the transport tube can firmly be prevented. Further, the heat source main body and the transport tube can be arranged to be separated from each other, by reducing a transport pressure loss by resolving a roundabout route of the transport tube in mounting, flow of bubbles in accordance with boiling can be facilitated and a transport velocity of the liquid can be increased and therefore, adherence of scale can further be restrained.

Embodiment 10

Figure 27:
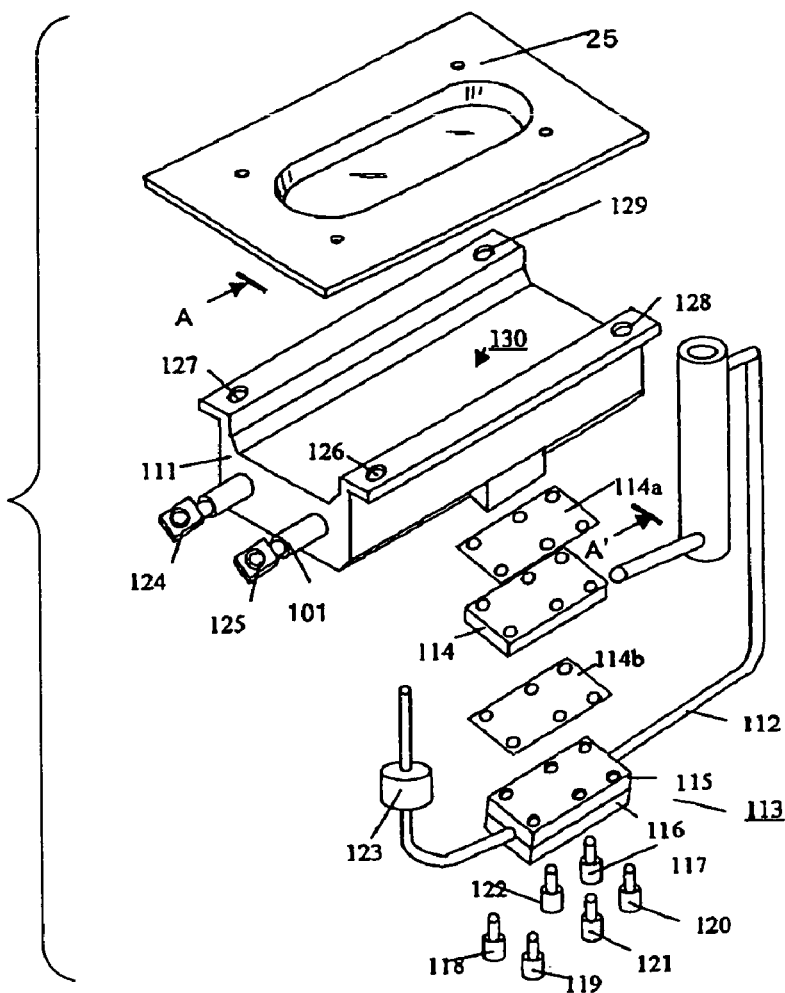
FIG. 27 is a disassembled perspective view of a steam supply mechanism according to Embodiment 10 of the invention.
Figure 28:
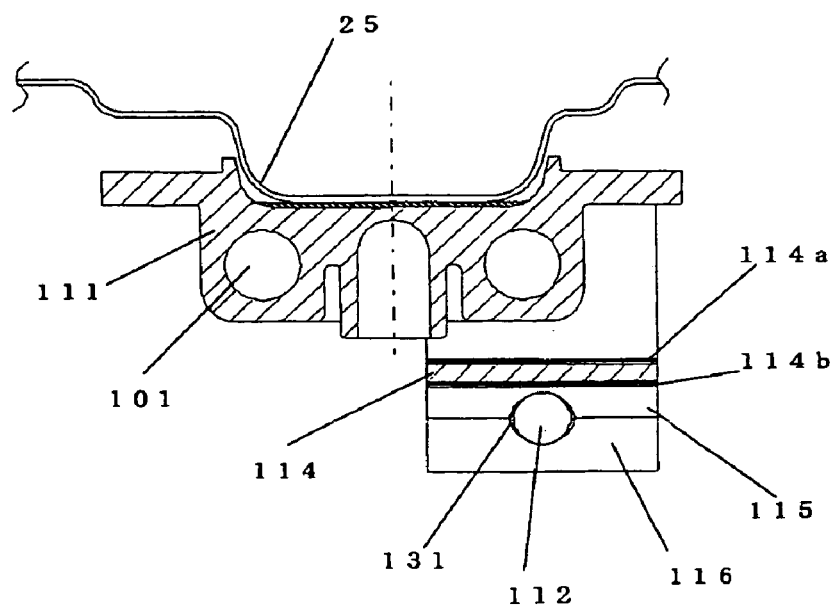
FIG. 28 is a sectional view taken along a line A-A' of FIG. 27.

FIG. 27 is a constitution view of a steam supply mechanism according to a tenth embodiment of the invention and FIG. 28 shows a sectional view taken along a line A-A' of FIG. 27.

In FIG. 27, FIG. 28, numeral 101 designates a sheathed heater in a U-like shape constituting heating means, numeral 111 designates a heating means main body constituted by aluminum diecast molding embedded with the heating means 101, numeral 112 designates a transport tube constituted by a material having a soft hardness and a high heat conductivity of aluminum or copper, and numeral 113 designates a heating portion for boiling a liquid at inside of the transport tube 12. The heating means main body 111 is constituted by diecast molding using an aluminum material. Numeral 114 designates heat conduction amount restraining means which is arranged between the heating means main body 111 and the heating portion 113. The heating portion 113 is constituted by two members 115, 116 and is constituted to sandwich the transport tube 112 by the two members. The member 115 is provided with a contact portion 115a in a semicircular shape at a center portion in a transport direction of the transport tube 112 and is brought into contact with the transport tube 112 in all the regions in the transport direction. On the other hand, also the member 116 is similarly provided with the contact portion 116a in a semicircular shape and is constituted to be brought into contact with the transport tube 112 in all the region in the transport direction. The two members 115, 116 and the transport tube 112 are integrated by screws 117, 118, 119, 120.

Further, the heating portion 113 integrally integrated with the transport tube 112 is integrated to the heating means main body 111 via the heat conduction restraining means 114 by using screws 121, 122. Numeral 123 designates a check valve provided on an upstream side of the heating portion 113 in the liquid transport direction, and numerals 124, 125 designate wire connecting portions for connecting power supply lead wires of the sheathed heater 101.

In the heat conduction amount restraining means 114, there is used a material having a heat conductivity lower than those of a material for molding the heating means main body 111 and a material of the transport tube by one digit or more. Although iron, stainless steel or the like can be selected, stainless steel is selectively used in consideration of corrosion resistance. Further, in integrating the heat conduction amount restraining means 114, between the heat conduction amount restraining means 114 and a side of the heating means main body 111 and between the heat conduction amount restraining means 114 and the heating portion 113, there is interposed silicone grease or carbon sheets 114a, 114b or the like to exclude unnecessary restraint of heat conduction at a portion other than the heat amount restraining means 114.

Figure 29:
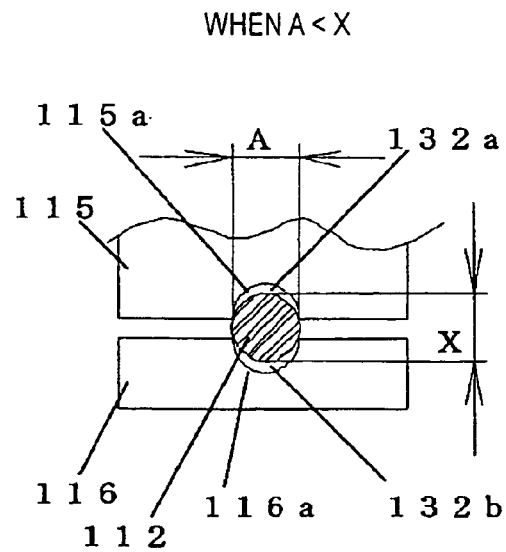
FIGS. 29(a)-29(d) illustrate sectional views showing a state of pinching a transport tube by two members of a transport tube heating portion shown in FIG. 27.
Figure 29:
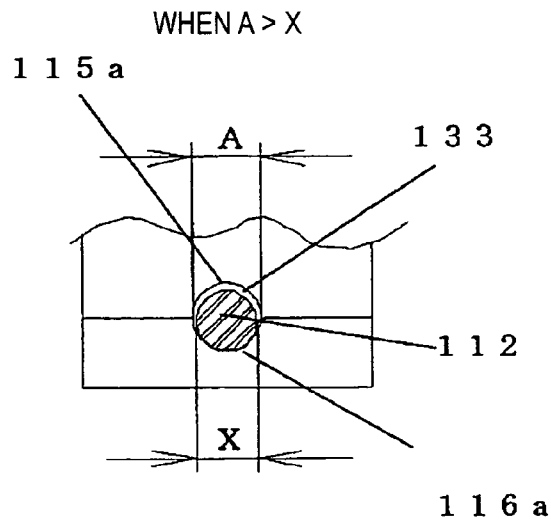
Figure 29:
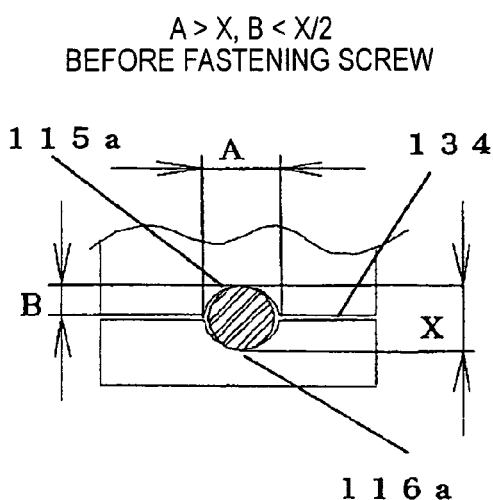
Figure 29:
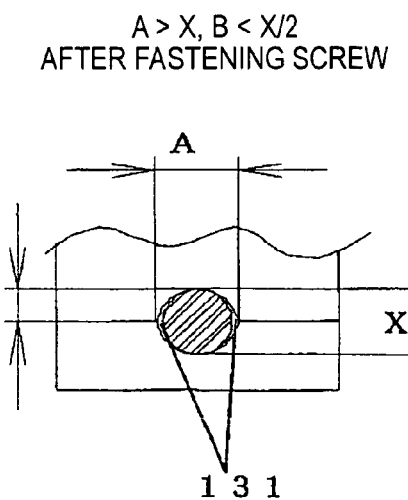

FIG. 29 illustrates sectional views showing a state of pinching the transport tube 112 by the two members 115, 116 of the transport tube heating portion 113. As shown by FIG. 29(a), when a width dimension A of the groove portion 115a, 116a in the semicircular shape is smaller than an outer shape dimension X of the transport tube 112, the transport tube 112 cannot brought into contact with the groove portions 115a, 116a in the semicircular shape but spaces 132a, 132b are produced and not only sufficient heat conduction cannot be ensured but also the two members 115, 116 cannot be brought into close contact with each other to fix.

Further, as shown by FIG. 29(b), when the width dimension A of the groove portions 115a, 116a in the semicircular shape is larger than the outer shape dimension X of the transport tube 112, the transport tube 112 is not brought into contact with the groove portions 115a, 116a in the semicircular shape and also the two members 115, 116 can be brought into close contact with each other to fix. Also in this case, a space 115a is produced, however, sufficient heat conduction performance can be ensured by interposing a soft material having a high heat conductivity such as silicone grease. However, under the state, a force of bringing the transport tube 112 and the transport tube heating portion BR>P13 into close contact each other is not sufficient and there is a possibility that the transport tube 112 is moved in the transport tube heating portion 113.

Further, as shown by FIG. 29(c), when the width dimension A of the groove portions 115a, 116a in the semicircular shape is larger than the outer shape dimension X of the transport tube 112 and a depth dimension B of the groove portions 115a, 116a in the semicircular shape is larger than an outer shape radius dimension X/2 of the transport tube 112, the transport tube 112 is brought into a state of being pinched by the groove portions 115a, 116a in the semicircular shape and the transport tube 112 is brought into close contact with the transport tube heating portion 113 to fix. In the state, a space 134 is produced between the two members 115, 116, however, when the two members 112 are fastened by a screw as shown by FIG. 29(d), since the transport tube 112 is formed by aluminum or copper having the soft hardness, the two members 115, 116 can be brought into close contact with each other to fix by being easily be deformed by being pinched thereby. Also under the state, a heat conduction performance can further promoted by pinching the soft material 131 having the high heat conductivity such as silicone grease therebetween.

Figure 30:
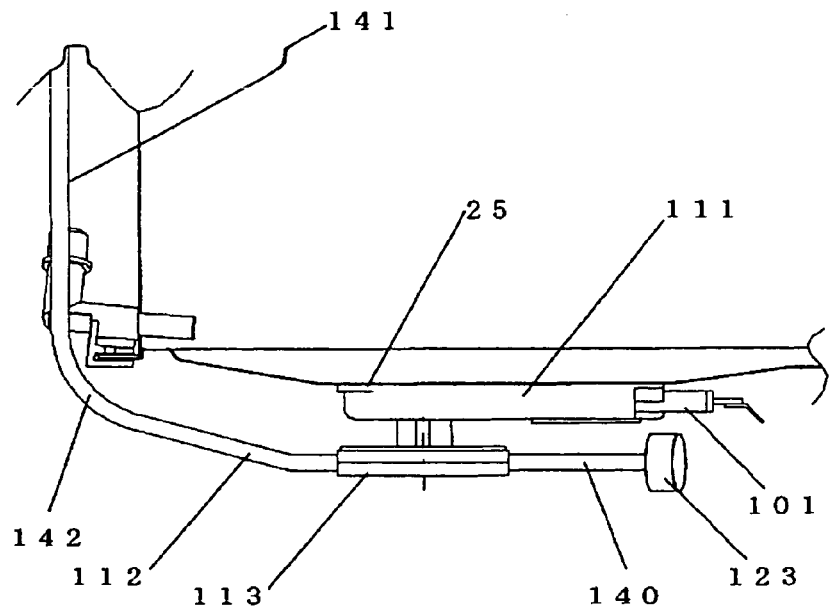
FIG. 30 is an outlook view showing a constitution of the transport tube 112 according to Embodiment 10 of the invention.

FIG. 30 is an outlook view showing the constitution of the transport tube 112. The heating means main body 111 is arranged to be brought into contact with the lower face of the fed water receiving bowl 25 and heat is conducted to a horizontal pipe portion 140 of the transport tube 112 through the heating portion 113. The horizontal pipe portion 140 is brought into contact with the heating portion 113 at a lowest portion thereof in the liquid transport direction of the transport tube 112 and even when local boiling is produced in the transport tube and bubbles are brought about, since bubbles are going to move to an upper side in the gravitational force direction, bubbles pass through a bent portion 142 disposed upward from a portion thereof brought into contact with the heating portion 113 disposed at the lowest portion and are discharged to outside from an air intake port (not illustrated) constituted on an upper side of a vertical pipe portion 141.

With regard to the steam supply mechanism constituted as described above, way of operating the mechanism and operation thereof will he explained as follows.

An explanation will be given by constituting a liquid to be transported by water. First, a tank for storing water (not illustrated) is installed on a side of the check valve 123. Thereby, water is injected into the transport tube 112. Thereafter, the sheathed heater 101 is operated. In accordance with starting to operate the sheathed heater 101, the heating means main body 111 is heated and a temperature rises. Heat of the heating means main body 111 is conducted to the main member 116 by way of the heat conduction amount restraining means 114, the member 115 of the heating portion 113 and the transport tube 112 is heated. Local boiling of water is produced at a pipe wall portion at a portion at which a pipe wall temperature of the transport tube 112 exceeds 100° C. Bubbles produced in accordance with the boiling are expanded into a gas to push water in the transport tube to both sides in the transport direction. The check valve 123 is arranged on an upstream side in the transport direction and the check valve 123 is brought into a closed state by being pushed by water in the transport tube 112. In accordance with, bubbles produced by boiling are escaped only to a downstream side in the transport direction. The check valve 123 is brought into an opened state in corporation with movement of the bubbles to the downstream side in the transport direction, and water is injected from the water storing tank into the transport tube 112. Water is transported by repeating the phenomenon. Transported water is guided to a so-to-speak evaporating portion 25. The evaporating portion is constituted to be conducted with heat energy from the heating means main body 111 and therefore, water injected into the evaporating portion 25 is further heated to evaporate.

In the above-described operation, at a region of the transport tube 112 brought into contact with the heating portion 113 and the evaporating portion, water is boiled and therefore, a residue of calcium, magnesium or the like included in water is adhered to a wall face to remain. The adhered residue is referred to as a scale. By continuing to adhere scale, an inner section of the transport tube 112 is gradually narrowed and in the worst case, a transport function does not work. Further, an amount of conducting heat to the evaporating portion and the transport tube is reduced.

Further, as shown by the constitution drawing of the embodiment, by arranging the main member 116 at the lowest portion in the gravitational direction of the transport tube 112 as the constitution of the heating portion 113, bubbles produced by the boiling phenomenon at inside of the transport tube 112 are moved to the upper side in the gravitational force direction. Although when bubbles are produced by boiling, a temperature of an inner wall face which is not exposed to water is going to be a high temperature immediately, adherence of scale can be restrained by restraining a rise of the wall face temperature of the transport tube by making water immediately flow to the portion of boiling.

Further, by increasing a bending radius dimension of the bent portion 142 connected to the horizontal pipe portion 140 and the vertical pipe portion 141, a resistance of transporting the liquid is reduced, flow of bubbles is facilitated, a transport velocity of the liquid can be increased and therefore, adherence of scale can be restrained and also boiling sound emitted by making the liquid expanded by producing bubbles flow in one motion.

As a specific example, when the bending radius dimension of the bending portion 142 is set to be equal to or larger than 25 mm, the phenomenon of the boiling sound or the like is difficult to be brought about and excellent liquid transport function can be achieved.

Embodiment 11

Figure 31:
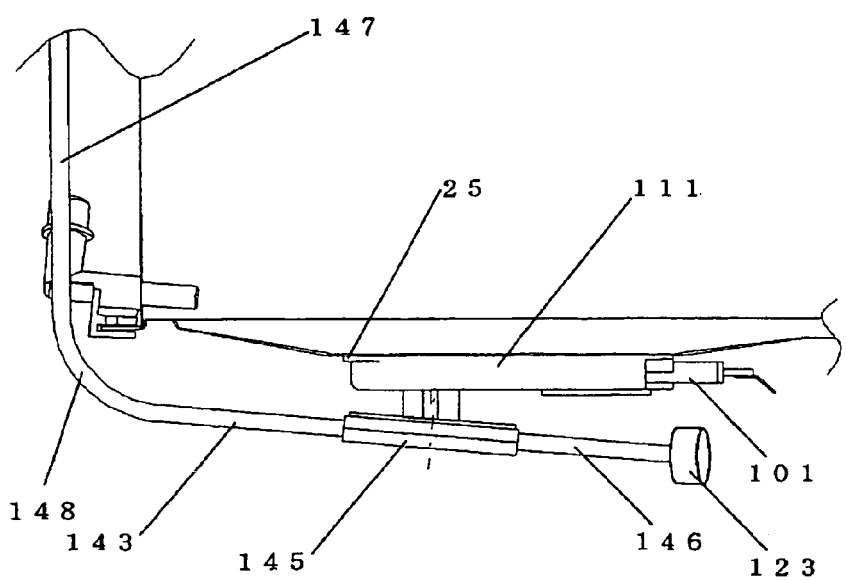
FIG. 31 is an outlook view showing a constitution of a transport tube 143 according to Embodiment 11 of the invention.

FIG. 31 is an outlook view of a steam supply mechanism according to an eleventh embodiment of the invention. A point of Embodiment 11 which differs from Embodiment 10 resides in a constitution in which a heating portion is bonded with a portion of the transport tube inclined upwardly in the liquid transport direction.

In FIG. 31, the heating means main body 111 is arranged to be brought into contact with the lower face of the fed water receiving bowl 25 and heat is conducted to a horizontal pipe portion 146 of a transport tube 143 via a heating portion 145. The horizontal pipe portion 146 is upwardly inclined in the liquid transport direction of the transport tube 143, the inclined portion is brought into contact with a heating portion 145 and even when bubbles are assumedly produced by producing local boiling in the transport tube, bubbles are going to move to the upper side in the gravitational force direction and therefore, bubbles pass through a bent portion 148 disposed upward from a portion thereof brought into contact with the upwardly inclined heating portion 145 and discharged to outside from an air intake port (not illustrated) constituted on an upper side of the vertical pipe portion 147.

Content with regard to the constitution of the heating portion 145 is similar to that in Embodiment 1 and an explanation thereof will be omitted. According to the steam supply mechanism constituted as described above, the horizontal pipe portion 146 is upwardly inclined in the liquid transport direction of the transport tube 143, by bringing the horizontal pipe portion 146 into contact with the heating portion 145 at the inclined portion, bubbles produced by the boiling phenomenon at inside of the transport tube 143 are moved to the upper side in the gravitational force direction and flow is produced in the horizontal pipe portion 146 inclined upwardly in the liquid transport direction. Although when bubbles are produced by boiling, a temperature of an inner side wall face thereof which is not exposed to water is going to be a high temperature immediately, by producing the flow in water, water is made to flow to the portion of boiling immediately, a rise of the wall face temperature of the transport tube is restrained and adherence of scale can further be restrained.

Embodiment 12

Figure 32:
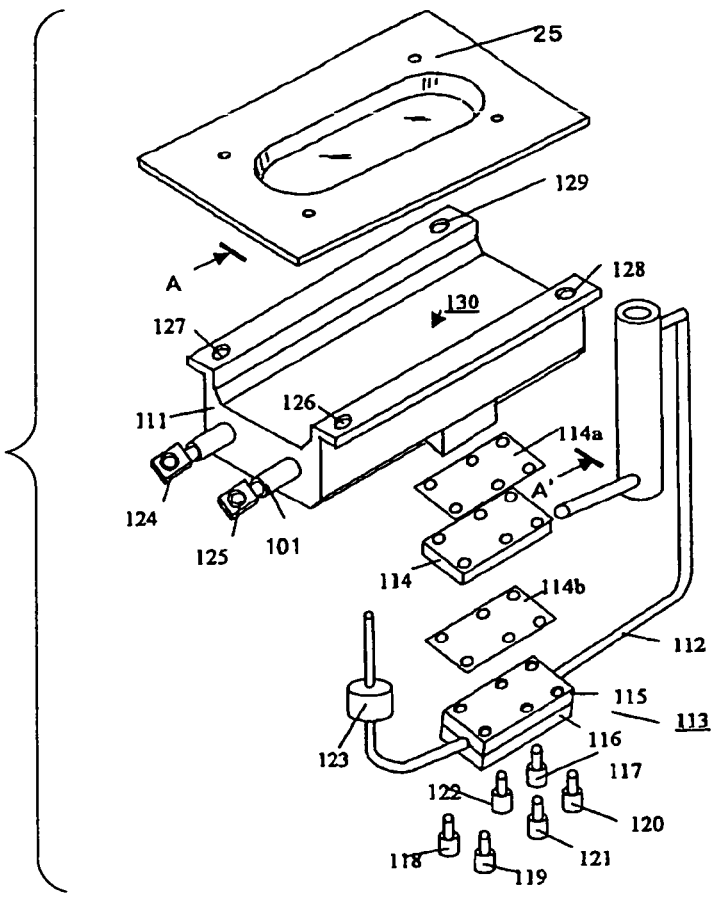
FIG. 32 is a disassembled perspective view of a steam supply mechanism according to Embodiment 12 of the invention.
Figure 33:
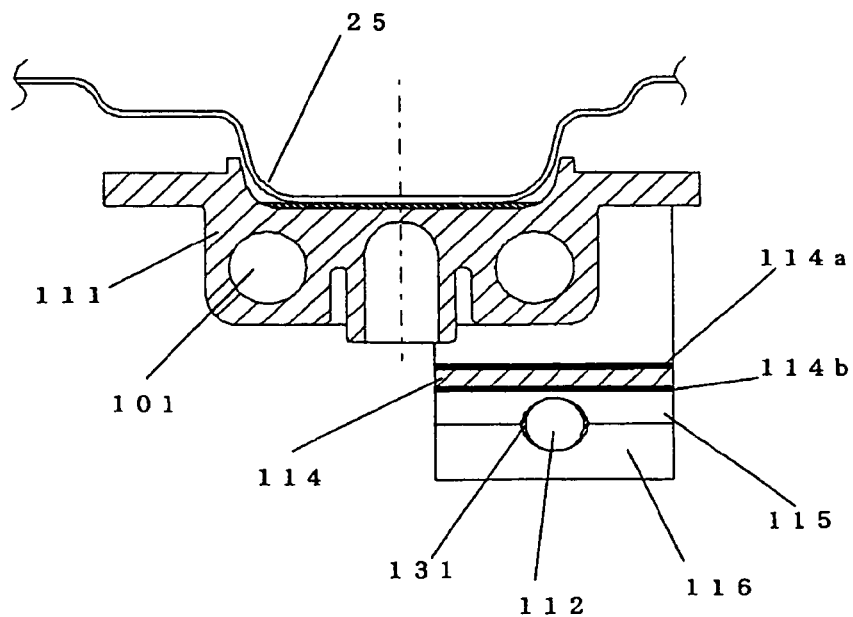
FIG. 33 is a sectional view taken along a line A-A' of FIG. 32.

FIG. 32 is a constitution view of a steam supply mechanism according to an eleventh embodiment of the invention and FIG. 33 shows a sectional view taken along a line A-A' of FIG. 32.

In FIG. 32, FIG. 33, numeral 101 designates a sheathed heater in a U-like shape constituting heating means, numeral 111 designates a heating means main body constituted by aluminum diecast molding embedded with the heating means 101, numeral 112 designates a transport tube constituted by a material having a soft hardness and a high heat conductivity of aluminum or copper, and numeral 113 designates a heating portion for boiling a liquid in the transport tube 112. The heating means main body 111 is constituted by diecast molding using an aluminum material. Numeral 114 designates heat conduction amount restraining means which is arranged between the heating means main body 111 and the heating portion 113.

The heating portion 113 is constituted by two members 115, 116 and is constituted to sandwich the transport tube 112 by the two members. The member 115 is provided with a contact portion 115a in a semicircular shape at a center portion in a transport direction of the transport tube 112 and is brought into contact with the transport tube 112 in all the region in the transport direction. On the other hand, also the member 116 is provided with a contact portion 115a in a semicircular shape and is constituted to be brought into contact with the transport tube 12 at all the region in the transport direction. The two member 115, 116 and the transport tube 112 are integrated by screws 117, 118, 119, 120.

Further, the heating portion 113 integrally integrated with the transport tube 112 is integrated to the heating means main body 111 via the heat conduction restraining means 114 by using screws 121, 122. Numeral 123 designates a check valve provided on an upstream side of the heating portion 113 in the liquid transport direction and numerals 124, 125 designate wire connecting portions for connecting power supply lead wires of the sheathed heater 101.

There is a used a material having a heat conductivity lower than those of a material of molding the heating means main body 111 and a material of the transport tube 112 by one digit or more for the heat conduction amount restraining means 114. Although iron, stainless steel or the like can be selected, stainless steel is selectively used in consideration of corrosion resistance.

Further, in integrating the heat conduction amount restraining means 114, between the heat conduction amount restraining means 114 and a side of the heating means main body 111 and between the heat conduction amount restraining means 114 and the heating portion 113, there is interposed silicone grease, carbon sheets 114a, 114b or the like to exclude unnecessary restraint of heat conduction at a portion other than the heat conduction amount restraining means 114.

Figure 34:
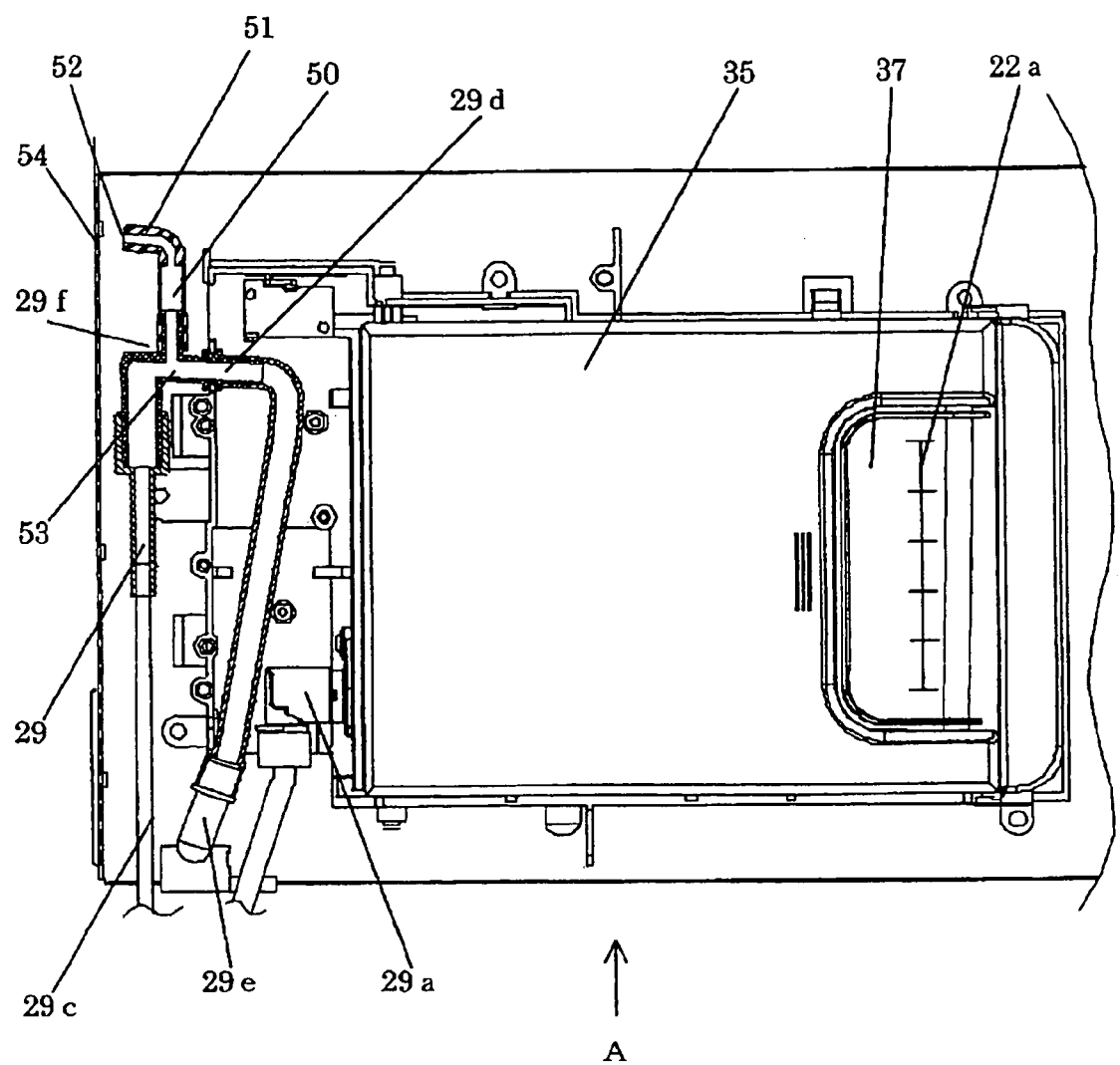
FIG. 34 is an explanatory view of an attaching structure at a side face of the apparatus of a steam supply mechanism.

FIG. 34 is an explanatory view of an attaching structure at a side face of an apparatus of the steam supply mechanism.

In FIG. 34, an air intake port (air exhaust portion) 29f is provided on an upper side of a vertical pipe portion 29c and at a topmost portion of a water feeding path (transport tube) 29. A vertical bonding portion 50 of the air intake port (air discharge portion) 29f is bonded to an upper pipe portion 29d substantially in a vertical direction, and a front end thereof is provided with a front end exhaust hole 52 to be directed to a side of a heating chamber rear wall 54 by a bent portion 51 inclined upwardly more or less from a horizontal direction. Further, the front exhaust hole 52 is constituted to be smaller than a dimension of a transport tube bonding portion 53.

With regard to the steam supply mechanism constituted as described above, way of operating the mechanism and operation thereof will be explained as follows.

An explanation will be given by constituting a liquid to be transported by water. First, a tank (not illustrated) for storing water is stalled on a side of the check valve 123. Thereby, water is injected into the transport tube 112. Thereafter, the sheathed heater 101 is operated. In accordance with starting to operate the sheathed heater 101, the heating means main body 111 is heated and the temperature rises. Heat of the heating means main body 111 is conducted to the main member 116 by way of the heat conduction amount restraining means 114 and the member 115 of the heating portion 113 and the transport tube 112 is heated. Local boiling of water is produced at a pipe wall portion at a portion of the transport tube 112 at which a pipe wall temperature thereof exceeds 100° C. Bubbles produced in accordance with the boiling are expanded into a gas to push water in the transport tube 112 to both sides in a transport direction.

The check valve 123 is arranged on an upstream side in the transport direction and the check valve 123 is brought into a closed state by being pushed by water in the transport tube 112. In accordance therewith, bubbles produced by boiling escape only to a downstream side in the transport direction. The check valve 113 is brought into an opened state in corporation with movement of bubbles to the downstream side in the transport direction, and water is injected from the water storing tank into the transport tube 112. Water is transported by repeating the phenomenon. Transported water is guided to a so-to-speak evaporating portion 25. The evaporating portion 25 is constituted to be transmitted with heat energy from the heating means main body 111 and therefore, water injected to the evaporating portion 25 is further heated to evaporate.

However, as shown by the constitution drawing of the embodiment, bubbles produced by the boiling phenomenon at inside of the transport tube 112 are moved to an upper side in the gravitational force direction. Although when bubbles are produced by boiling, a temperature of an inner wall face which is not exposed to water is going to be a high temperature immediately, adherence of scale can be restrained by restraining a rise of the wall face temperature of the transport tube by immediately making water flow to the portion of boiling.

Further, bubbles produced by the boiling phenomenon at inside of the transport tube 112 are moved to the upper side in the gravitational direction and moved in a direction from the vertical pipe portion 29c to the upper pipe portion 29d. Since the air intake port (air exhaust portion) 29f is provided at the topmost portion of the water feeding path (transport tube) 29, moved bubbles do not stay at the topmost portion but exhausted to outside form the air intake port (air exhaust portion) 29f.

Further, the vertical bonding portion 50 is arranged in a direction substantially orthogonal to the liquid transport direction of the upper pipe portion 29d and therefore, an influence is less effected to transportation of the liquid, the front end exhaust hole 52 is made to be smaller than the transport tube bonding portion 53 and therefore, there is constructed a constitution in which pressure is increased against the liquid transport direction and water is difficult to invade the front end exhaust hole 52.

Further, even when transported water assumedly advances to the vertical bonding portion 50, by being directed to the side of the heating chamber rear wall 54 by the bent portion 51, bumped water adheres to the heating chamber rear wall 54 and is safely discharged along the wall face. Further, since the front end exhaust hole 52 is not directed upwardly, invasion of dust and dirt from the hole is prevented and hygienic performance at inside of the water feeding path (transport tube) 29 can be promoted.

Further, the front end of the vent portion 51 is inclined more or less upwardly from the horizontal direction, even when steam generated from boiled water invades the air intake port (air exhaust portion9 29f and condensed to the inner portion, condensed water drops along the inclination and therefore, condensed water is not discharged from the front end exhaust hole 52 but returns to the water feeding path (transport tube) 29 by being guided by a side of the vertical bonding portion 50, a danger of insulation failure by dropping condensed water to outside is prevented and also condensed water can effectively be utilized.

INDUSTRIAL APPLICABILITY

According to the high frequency heating apparatus having the steam generating function of the invention, the exclusive pump means is dispensed with by achieving a pump function by boiling water in the water feeding path by heat generated by the heating means and therefore, simplification and small-sized formation of the constitution of the steam supply mechanism can be realized.

Further, a control of an amount of supplying steam can be achieved by only controlling heat generating operation of the heating means and therefore, a control processing can be simplified.

Further, when the steam generating portion constituted by the fed water receiving bowl and the heating means are dispersingly mounted at a plurality of portions in the heating chamber, uniform supply of heated steam at inside of the heating chamber can inexpensively be realized.

Further, adherence of scale in accordance with local boiling at inside of the heat transport portion pipe can be restrained by restraining an amount of conducting heat to the heat transport portion while ensuring heat energy to the evaporating portion by maintaining the temperature of the heat transport portion within a range of 100 through 120° C. Further, there can be provided the steam supply mechanism excellently maintaining the balance of supplying heat energy to a side of the heat transport portion and a side of the evaporating portion and continuously generating steam at high temperature near to 100° C.

Further, by exhausting bubbles produced by boiling water in the transport tube from the air exhaust portion constituted at the topmost portion of the water feeding path, bubbles are prevented from staying at the portion bonded with the heating means, rise of the wall face temperature of the transport tube is restrained by making the liquid immediately flow to the boiling generating portion, a stable liquid transport function is ensured, adherence of scale can be restrained and high temperature steam can continuously be generated.

The invention claimed is:

1. A high frequency heating apparatus having a steam generating function, comprising:
   a heating chamber containing a heated object;
   high frequency wave generating means for outputting a high frequency wave into the heating chamber; and
   a steam supply mechanism for supplying heated steam into the heating chamber;
   wherein the heated object is heated to process by supplying at least either of the high frequency wave and the heated steam to the heating chamber;

wherein the steam supply mechanism comprises:
a water storing tank mounted attachably and detachably to and from an apparatus main body;
an evaporating portion mounted to inside of the heating chamber;
heating means for evaporating water by heating the evaporating portion;
a transport tube for transporting water to the evaporating portion by making water in the water storing tank boil locally by an energy generated by the heating means; and
a heat conduction control portion comprising a material having a heat conductivity smaller than a heat conductivity of a material forming the evaporating portion and interposed between the transport tube and the heating means; and
wherein an amount of a heat energy conducted from the heating means to the heat transport portion is controlled.

2. The high frequency heating apparatus having a steam generating function according to claim 1, wherein the amount of the heat energy supplied from the heating means to the transport tube is made to be equal to or smaller than ⅛ of an amount of a heat energy supplied to the evaporating portion.

3. The high frequency heating apparatus having a steam generating function according to claim 1, wherein the heat energy of the heating means is conducted to a heat conduction control portion by way of a material having a larger heat conduction characteristic in a face direction rather than in a thickness direction.

4. The high frequency heating apparatus having a steam generating function according to claim 1, wherein a sheathed heater constituting the heating means is embedded in an aluminum diecast, the evaporating portion constituted by forming a steel plate subjected to a water repelling treatment in a recess shape is bonded to an upper face thereof, and the transport tube is bonded to a side face or a bottom face of the aluminum diecast by way of the heat conduction control portion formed by stainless steel.

5. The high frequency heating apparatus having a steam generating function according to claim 4, wherein the evaporating portion is made to be attachable and detachable to and from the aluminum diecast.

6. The high frequency heating apparatus having a steam generating function according to claim 1, wherein a sheathed heater constituting the heating means is embedded in an aluminum diecast, a recess portion is provided at an upper face thereof to constitute the evaporating portion, and the transport tube is bonded to a side face or a bottom face of the aluminum diecast by way of the heat conduction control portion formed by stainless steel.

7. The high frequency heating apparatus having a steam generating function according to claim 6, wherein a surface of the evaporating portion is subjected to a water repelling treatment.

8. The high frequency heating apparatus having a steam generating function according to claim 1, wherein the transport tube is formed by aluminum or copper having a large heat conductivity.

9. The high frequency heating apparatus having a steam generating function according to claim 1, wherein an inner side surface area of the transport tube is made to be larger than an outer side surface area thereof.

10. The high frequency heating apparatus having a steam generating function according to claim 9, wherein an inner face of the transport tube is subjected to a water repelling treatment.

11. The high frequency heating apparatus having a steam generating function according to claim 4, 7 or 10, wherein the water repelling treatment is fluorine water repelling treatment.

12. The high frequency heating apparatus having a steam generating function according to claim 11, wherein the evaporating portion is made to be attachable and detachable to and from the aluminum diecast.

13. The high frequency heating apparatus having a steam generating function according to claim 1, wherein a temperature of the transport tube in transporting water to the evaporating portion is restrained to be equal to lower than 120° C. by producing local boiling by a heat energy conducted from the heat conduction control portion.

14. The high frequency heating apparatus having a steam generating function according to claim 13, wherein based on a heater block constituted by embedding a sheathed heater constituting the heating means in an aluminum diecast, a thermistor for detecting a temperature of the heater block and a detected signal of the thremistor, by controlling to operate the heater block, a temperature of the transport tube is controlled.

15. The high frequency heating apparatus having a steam generating function according to claim 13, based on a heater block constituted by embedding a sheathed heater constituting the heating means in an aluminum diecast, a thermistor for detecting a temperature of the heat conduction control portion, and a detected signal of the thermistor, by controlling to operate the heater block, a temperature of the transport tube is controlled.

16. The high frequency heating apparatus having a steam generating function according to claim 14 or 15, wherein based on the detected signal of the thermistor, when a number of times of operating to make the heating means ON-OFF reaches a predetermined threshold, the heating means is stopped to operate and an abnormality is informed.

17. The high frequency heating apparatus having a steam generating function according to claim 1, wherein the steam supply mechanism includes a transport tube heating portion for boiling water in the transport tube by utilizing the heat energy of the heating means, and a check valve provided on an upstream side of the heating portion in a liquid transport direction.

18. The high frequency heating apparatus having a steam generating function according to claim 17, wherein a material constituting the transport tube is constituted by aluminum or copper and a material of heat conduction amount restraining means is constituted by stainless steel.

19. The high frequency heating apparatus having a steam generating function according to claim 17, wherein the transport tube heating portion is constituted by at least two members, the transport tube is mainly heated by a main member disposed on a lower side in a gravitational force direction and a remaining member conducts the heat energy of the heating means to the main member.

20. The high frequency heating apparatus having a steam generating function according to claim 19, wherein the main member is constituted to diffuse heat in the liquid transport direction.

21. The high frequency heating apparatus having a steam generating function according to claim 17, wherein the transport tube is constituted to be integrally integrated to a main body including the heating means.

22. The high frequency heating apparatus having a steam generating function according to claim 17, wherein the heat conduction controlling means is constituted by a heat pipe.

23. The high frequency heating apparatus having a steam generating function according to claim 1, wherein the steam generating mechanism includes a check valve arranged upstream from the heating means for preventing water from flowing back from the transport tube to the water storing tank and a bubble generated by boiling water in the transport tube by utilizing the heat energy of the heating means is prevented from moving to a side of the check valve.

24. The high frequency heating apparatus having a steam generating function according to claim 23, wherein a transport tube heating portion for boiling water in the transport tube by utilizing the heat energy of the heating means is bonded to a portion of the transport tube disposed at a lowest portion thereof in the liquid transport direction.

25. The high frequency heating apparatus having a steam generating function according to claim 23, wherein the transport tube heating portion for boiling water in the transport tube by utilizing the heat energy of the heating means is constituted to be bonded to a portion of the transport tube inclined upwardly in the liquid transport direction.

26. The high frequency heating apparatus having a steam generating function according to claim 24 or 25, wherein the transport tube heating portion is formed by at least two members respectives of which are constituted to include groove portions in a semicircular shape.

27. The high frequency heating apparatus having a steam generating function according to claim 26, wherein the transport tube heating portion is constituted such that a width dimension of the groove portion in the semicircular shape is made to be lager than an outer shape dimension of the transport tube.

28. The high frequency heating apparatus having a steam generating function according to claim 27, wherein the transport tube heating portion is constituted such that a depth dimension of the groove portion in the semicircular shape is made to be smaller than an outer shape radius dimension of the transport tube.

29. The high frequency heating apparatus having a steam generating function according to claim 28, wherein a pipe of the transport tube is formed by aluminum or copper having a soft hardness.

30. The high frequency heating apparatus having a steam generating function according to claim 24 or 25, wherein the transport tube heating portion is constituted to pinch a soft material having a high heat conductivity between two members to be brought into close contact with each other to fix.

31. The high frequency heating apparatus having a steam generating function according to claim 24 or 25, wherein the transport tube heating portion is constituted to be bonded to a vicinity of a bent portion of a sheathed heater of the heating means formed by arranging the sheathed heater molded by bending the sheathed heater substantially in a U-like shape in an integrating block made by aluminum diecast.

32. The high frequency heating apparatus having a steam generating function according to claim 23, wherein the transport tube is constituted such that a bending radius of a bent portion connecting a horizontal pipe portion and a vertical pipe portion is set to a large value.

33. The high frequency heating apparatus having a steam generating function according to claim 1, wherein a bubble generated by boiling water in the transport tube by utilizing the heat energy of the heating means is exhausted from an air exhaust portion provided at the transport tube.

34. The high frequency heating apparatus having a steam generating function according to claim 33, wherein the air exhaust portion for exhausting the bubble generated by boiling water in the transport tube is constituted to be disposed at a topmost portion of the transport tube in the liquid transport direction.

35. The high frequency heating apparatus having a steam generating function according to claim 33, wherein the air exhaust portion for exhausting the bubble generated by boiling water in the transport tube is constituted to be arranged in a direction substantially orthogonal to the transport tube in the liquid transport direction.

36. The high frequency heating apparatus having a steam generating function according to claim 33, wherein the air exhaust portion for exhausting the bubble generated by boiling water in the transport tube is constituted such that a front end thereof is bent to a side of a rear wall of the heating chamber.

37. The high frequency heating apparatus having a steam generating function according to claim 36, wherein a bent portion of the air exhaust portion is constituted to be inclined more or less upwardly from a horizontal direction.

38. The high frequency heating apparatus having a steam generating function according to claim 33, wherein a dimension of a front end exhaust hole of the air exhaust portion is constituted to be smaller than a hole dimension of a bonding portion of the transport tube.

* * * * *